(12) United States Patent  
Nishiwaki et al.

(10) Patent No.: US 7,505,389 B2
(45) Date of Patent: Mar. 17, 2009

(54) INFORMATION PROCESSING DEVICE AND INFORMATION RECORDING MEDIUM

(75) Inventors: Seiji Nishiwaki, Kobe (JP); Kazuo Momoo, Hirakata (JP)

(73) Assignee: Panasonic Corporation, Kadoma (JP)

( * ) Notice: Subject to any disclaimer, the term of this patent is extended or adjusted under 35 U.S.C. 154(b) by 723 days.

(21) Appl. No.: 11/100,028

(22) Filed: Apr. 6, 2005

(65) Prior Publication Data

US 2005/0226120 A1    Oct. 13, 2005

(30) Foreign Application Priority Data

Apr. 7, 2004    (JP)    ............................. 2004-112985

(51) Int. Cl.
    *G11B 7/00*    (2006.01)
(52) U.S. Cl. .............. 369/103; 369/112.05; 369/112.16
(58) Field of Classification Search ................. 369/103, 369/44.37, 44.38, 112.02, 112.19, 112.1, 369/109.01, 110.03, 112.05, 112.16, 110.02; 359/3, 10
    See application file for complete search history.

(56) References Cited

U.S. PATENT DOCUMENTS

| 5,917,798 A * | 6/1999 | Horimai et al. ............. 369/103 |
| 7,130,092 B1 * | 10/2006 | Horimai ....................... 359/35 |
| 2002/0114027 A1 | 8/2002 | Horimai |

FOREIGN PATENT DOCUMENTS

| CN | 1299507 A | 6/2001 |
| JP | 2002-063733 | 2/2002 |

OTHER PUBLICATIONS

Office Action dated May 23, 2008 issued for the corresponding Chinese Patent Application No. 200510064838.8 and partial English translation thereof.

* cited by examiner

*Primary Examiner*—Thang V Tran
(74) *Attorney, Agent, or Firm*—Renner, Otto, Boisselle & Sklar, LLP

(57) ABSTRACT

There is provided an information processing device which is capable of suppressing generation of stray light at the time of recording and reproduction of information, thus enabling quality information recording and reproduction. The information processing device includes: a radiation light source 2; and a converging section for converging rays emitted from the light source toward an information recording medium having a photosensitive layer 11b, wherein the converging section splits the rays into first and second rays 3' and 3 respectively traveling through first and second spaces as divided by a plane at least containing a point optical axis L, and converges the first and second rays 3' and 3 onto first and second points 12' and 12 in the information recording medium 11, the photosensitive layer 11b being interposed between the first and second points 12' and 12. Between the first and second points 12' and 12, the first and second rays 3' and 3 interfere with each other to form interference fringes, the interference fringes representing information to be recorded in the photosensitive layer 11b of the information recording medium 11.

24 Claims, 12 Drawing Sheets

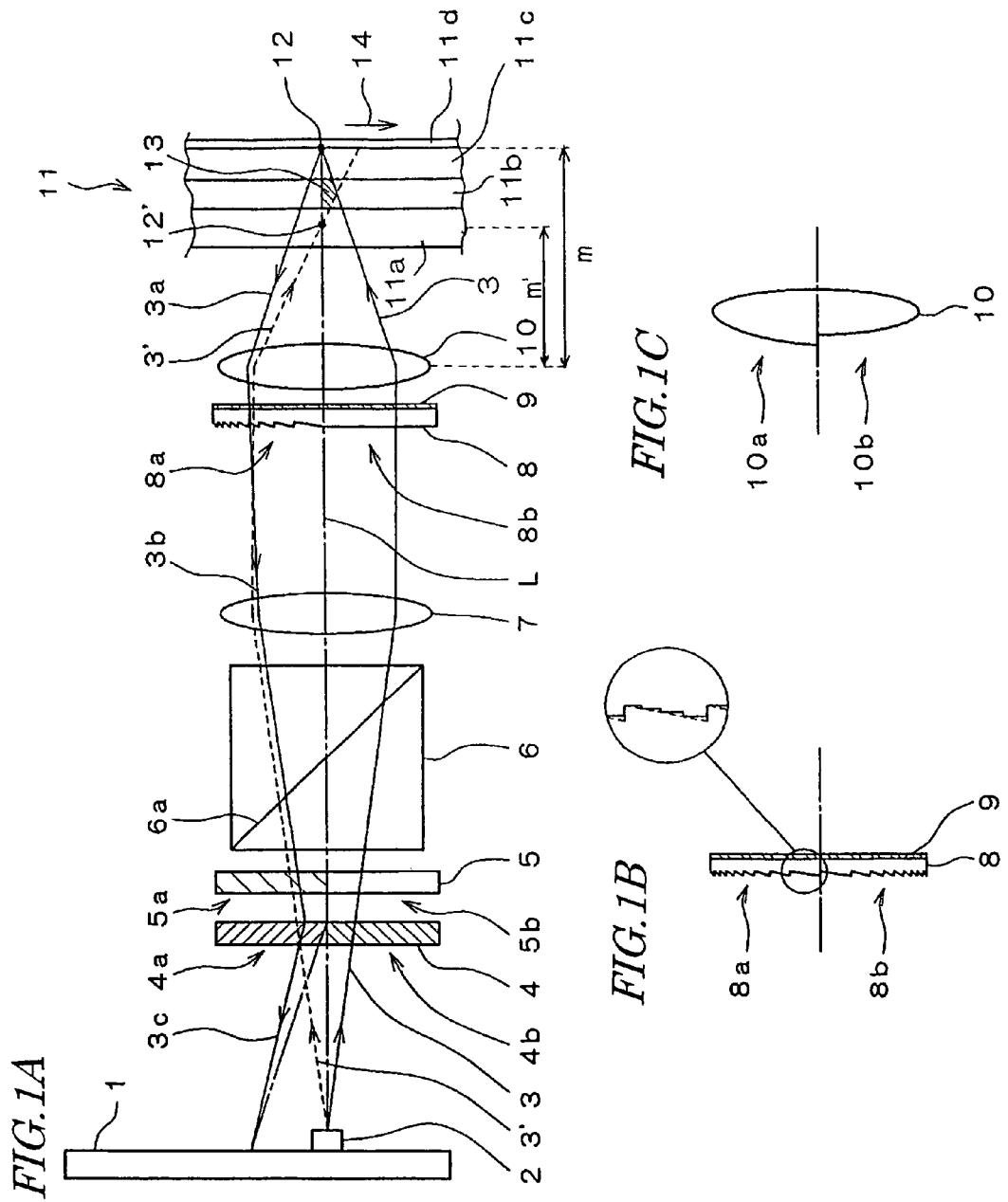

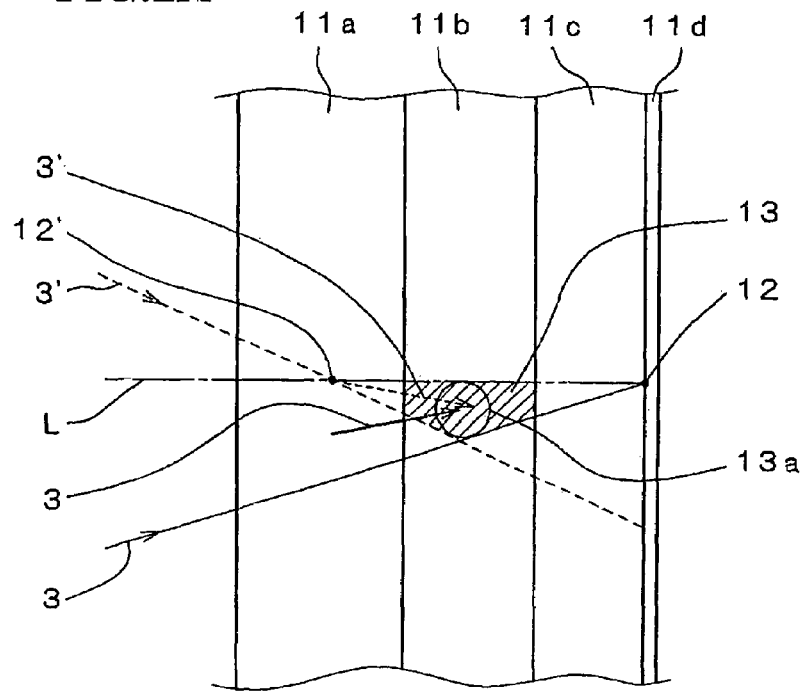
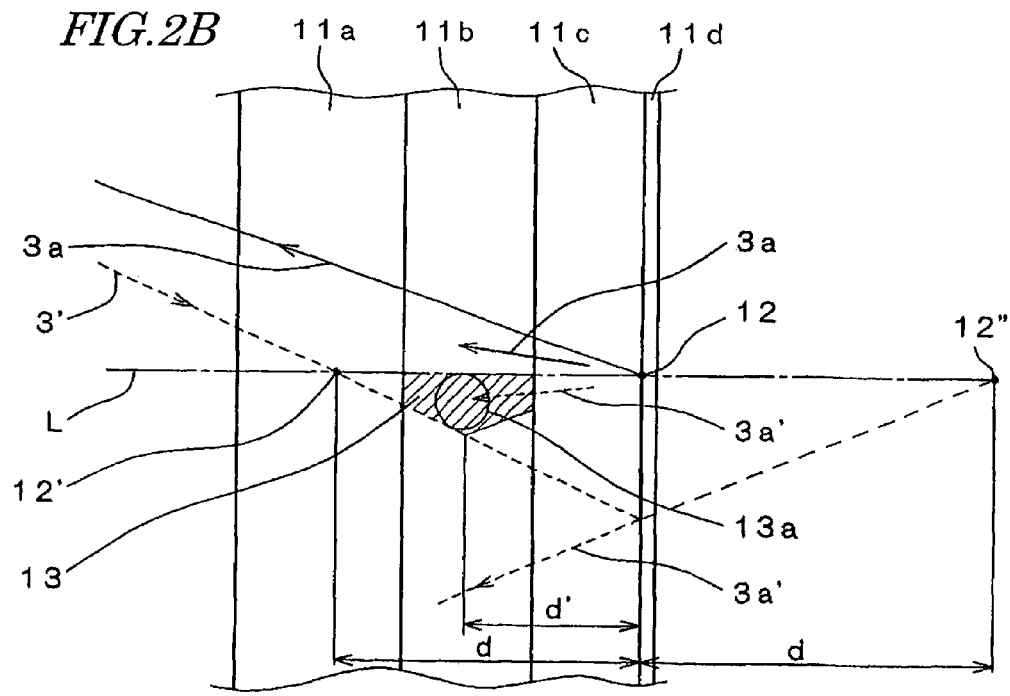

INFORMATION PROCESSING DEVICE AND INFORMATION RECORDING MEDIUM

BACKGROUND OF THE INVENTION

1. Field of the Invention

The present invention relates to: an information recording medium on which to record information; and an information processing device for recording information on an information recording medium, or reproducing information which is recorded on an information recording medium.

2. Description of the Related Art

As techniques for recording a large amount of information, information recording or reproduction techniques employing an optical disk such as a CD or a DVD have conventionally been used widely. According to such techniques, as shown in FIG. 10A, information to be recorded is converted into a sequence of one-bit digital data 101 consisting of "0" and "1". Then, by modulating light based on the digital data sequence 101, and irradiating an information recording medium 100 with the modulated light, spaces and recording marks 102 corresponding to the digital data sequence 101 are formed on the information recording medium 100. Such techniques make it possible to record information on an information recording medium 100 having a capacity of several tens of Gbytes, or reproduce information from the recording medium 100.

On the other hand, as methods for recording even greater amounts of information, information recording/reproduction technique utilizing holography have been attracting attention in recent years. According to such techniques, as shown in FIG. 10B, for example, page data 111 which is in a two-dimensional arrangement can be recorded in a predetermined three-dimensional region 112 on the recording medium 110, by utilizing interference of light. Since the page data 111 may be of a capacity of e.g. several tens of Kbytes, by forming a multitude of three-dimensional regions 112 so as to overlap the tracks of the information recording medium 100, it becomes possible to record terabytes of data on the recording medium 110. Hereinafter, a conventional information recording/reproduction technique utilizing holography will be described.

FIG. 11 schematically shows an essential portion of an information recording/reproduction apparatus proposed in Japanese Laid-Open Patent Publication No. 11-311938, which utilizes holography. First, P-polarized laser light which is emitted from a radiation light source such as a semiconductor laser (not shown) is converted into parallel light by a collimating lens (not shown), and after being split into two paths by a half mirror (not shown), one of the split portions of light is led through a ½ wavelength plate (not shown) to become S-polarized rays 3'. The other split portion of light becomes P-polarized rays 3.

The rays 3', also called "information light", are modulated by information to be recorded during recording of information, as described below. On the other hand, the rays 3, also called "reference light", interfere with the information light during recording of information, whereby the information carried by the information light is recorded on the information recording medium in the form of interference fringes. During information reproduction, the interference fringes having been formed on the information recording medium is irradiated with the reference light, whereby diffracted light which is modulated in accordance with the recorded information is obtained.

After being led through a spatial modulator 5, the rays 3' are made slightly convergent by a convex lens 20, as shown by the broken lines. The rays 3' enter a polarization beam splitter 19, and are reflected from a polarization plane 19a thereof, so as to be led through a joint gyrator 18 in a direction along an optical axis L. Furthermore, the rays 3' are converged by an objective lens 10 onto a point 12' which is before a reflective layer 11d of an information recording medium 11.

The joint gyrator 18 is formed by attaching together two optical rotators of different optical rotation directions. Specifically, on a plane perpendicular to the optical axis L, the joint gyrator 18 is split into two regions 18a and 18b by a line extending through the optical axis L. In the region 18a, an optical rotator for rotating the polarization direction of the transmitted light by 45° in a clockwise direction is provided. In the region 18b, an optical rotator for rotating the polarization direction of the transmitted light by 45° in a counterclockwise direction is provided.

The spatial modulator 5 may be composed of a ferroelectric liquid crystal panel, for example. A region of the spatial modulator 5 which the rays 3' are led through is divided in a lattice fashion. The spatial modulator 5 is driven so as to cause an independent change in each split region, such as: shifting of the phase of the transmitted light by $\pi$ (phase modulation), or providing a zero light transmittance (amplitude modulation). Thus, a modulation pattern representing the aforementioned page data is formed through the spatial modulator 5. The modulation pattern is to be updated based on an external signal.

On the other hand, the P-polarized rays 3 enter the polarization beam splitter 19 along the optical axis L, and are transmitted through the polarization plane 19a thereof, so as to be led through the joint gyrator 18 along the optical axis L. Furthermore, the P-polarized rays 3 are converged by the objective lens 10 onto a point 12 on the surface of the reflective layer 11d of the information recording medium 11. Since only the rays 3' are transmitted through the convex lens 20, the rays 3 have a different converging point from that of the rays 3'.

The information recording medium 11 includes a transparent substrate 11a, a photosensitive layer 11b (e.g., photopolymer), a transparent layer 11c, and the reflective layer 11d. The photosensitive layer 11b is located substantially in the middle between the point 12 and the point 12'.

FIG. 12A shows optical paths within the information recording medium 11 of the rays 3 and the rays 3', which are radiated toward the information recording medium 11. At the point 12', the rays 3' are inverted with respect to the optical axis L. As a result, the bundle of rays 3 and the bundle of rays 3' intersect or overlap each other within a circle 13a in the photosensitive layer 11b. The rays 3 in the circle 13a are rotated counterclockwise by 45° with respect to the P-polarized light, due to an optical rotary action of the region 18b of the joint gyrator 18. On the other hand, the rays 3' are rotated clockwise by 45° with respect to the S-polarized light, due to an optical rotary action of the region 18a of the joint gyrator 18. As a result, within the circle 13a in the photosensitive layer 11b, the rays 3 and the rays 3' have the same polarization direction. In a circle 13b within the photosensitive layer 11b, the circle 13b being in a symmetrical position from the circle 13a with respect to the optical axis L, the rays 3 and the rays 3' similarly have the same polarization direction.

Thus, since the rays 3 and the rays 3' have the same polarization direction, these two bundles of rays interfere with each other within the photosensitive layer 11b, thus forming interference fringes. In the case where the output from the laser light source is large, the photosensitive layer 11b is exposed, whereby an interference pattern 13 having a refractive index distribution corresponding to the optical intensity distribution of the interference fringes is formed. The interference pattern 13 varies in accordance with the modulation pattern (page data) of the spatial modulator 5.

The information recording medium 11 is mounted to a disk motor, and is rotated in the direction of an arrow 14 shown in FIG. 11. On the surface of the reflective layer 11d, guide grooves (grating) having periodicity in the radius direction and extending along the direction of rotation are formed with an equal pitch, such that the converging point 12 of the rays 3 will be located on a guide groove. Therefore, with the disk rotation, the converged positions of the rays 3 and the rays 3' also make a relative rotary movement along a plane which is parallel to the guide grooves on the surface of the reflective layer 11d and to the reflective layer 11d. In the case where a spiral guide groove configuration is adopted, it would be possible to cause the converging point 12 of the rays 3 to a "next" guide groove with each rotation.

FIG. 12B illustrates optical paths within the information recording medium 11 in the case where the rays 3 and the rays 3' are reflected from the reflective layer 11d of the information recording medium 11. The rays 3' are reflected from the surface of the reflective layer 11d to become reflected rays 3a' (shown by broken lines), which may be regarded as originating from an imaginary emission point which is at a conjugate converging point 12" (which in itself is a conjugate image of the point 12' with respect to the reflection surface). The rays 3 are reflected from the surface of the reflective layer 11d, upon which the point 12 is located, to become rays 3a (shown by solid lines) which are inverted from the rays 3. Some of the reflected rays 3a' and some of the reflected rays 3a are led through the interference pattern 13.

After being transmitted through the information recording medium 11, the reflected rays 3a are led through the objective lens 10 so as to become parallel light, and then enter the joint gyrator 18. In principle, light which is led through the region 18a of the joint gyrator 18 in the forward path and whose polarization direction is thus rotated clockwise by 45° will restore its original polarization direction in the return path, by being led through the region 18b. Similarly, light which is led through the region 18b in the forward path and is thus rotated counterclockwise by 45° will restore its original polarization direction in the return path, by being led through the region 18a. Accordingly, after being led through the joint gyrator 18, the reflected rays 3a revert to P-polarized light, and are transmitted through the polarization plane 19a of the polarization beam splitter 19, so as to be led to a detector (not shown) via a splitting means such as a hologram. The detector receives the reflected rays 3a and generates a detection signal. By using this detection signal, a focusing error signal for controlling the focusing state of the rays 3 upon the reflective layer 11d and a tracking error signal for controlling the rays 3 so as to follow along the guide grooves are generated. On the basis of these signals, the objective lens 10 is driven so that the converging point of the rays 3 is controlled so as to follow along the guide grooves on the surface of the reflective layer 11d.

Next, referring to FIG. 13 and FIGS. 14A and 14B, a method for reproducing information which is recorded on the information recording medium 11 by using the information recording/reproduction apparatus disclosed in Japanese Laid-Open Patent Publication No. 11-311938, supra, will be described. As shown in FIG. 13, when reproducing a signal, only the P-polarized rays 3 which have been generated by using a semiconductor laser in the aforementioned manner are utilized. The rays 3 enter the polarization beam splitter 19 in the direction along the optical axis L, and are transmitted through the polarization plane 19a thereof and led through the joint gyrator 18 along the optical axis L. As described above, the rays 3 will have their polarization directions rotated at the regions 18a and 18b of the joint gyrator 18, and be converged by the objective lens 10 onto the point 12 on the surface of the reflective layer 11d of the information recording medium 11.

As shown in FIG. 14A, a ray 3 is reflected from the surface of the reflective layer 11d to become a reflected ray 3a. The reflected ray 3a propagates through the circle 13a in the interference pattern 13, thus producing diffracted light 3A. The polarization state of the diffracted light 3A is the same as that of the input light 3a. After converging on the point 12', the diffracted light 3A is inverted with respect to the optical axis L, and made slightly divergent by the objective lens 10. The polarization state of the diffracted light 3A is changed, when the diffracted light 3A is led through the joint gyrator 18.

Thus, among the rays 3, those which have passed through the region 18a of the joint gyrator 18 are P-polarized light which has been rotated clockwise by 45°, and produce diffracted light 3A in the circle 13a while maintaining its polarization direction. After converging on the point 12', the diffracted light 3A again passes through the region 18a of the joint gyrator 18. Since the polarization direction of the diffracted light 3A is further rotated clockwise by 45° at the joint gyrator 18, the polarization direction of the diffracted light 3A transmitted through the joint gyrator 18 has been rotated clockwise by 90° from that of the P-polarized light; thus, the diffracted light 3A has become an S-polarized ray 3B (FIG. 13).

Similarly, those rays 3 which have passed through the region 18b of the joint gyrator 18 are P-polarized light which has been rotated counterclockwise by 45°, and produce diffracted light 3A in the circle 13b while maintaining its polarization direction. After converging on the point 12', the diffracted light 3A again passes through the region 18b of the joint gyrator 18. Since the polarization direction of the diffracted light 3A is further rotated counterclockwise by 45° at the joint gyrator 18, the polarization direction of the diffracted light 3A transmitted through the joint gyrator 18 has been rotated counterclockwise by 90° from that of the P-polarized light; thus, the diffracted light 3A has become an S-polarized ray 3B (FIG. 13).

The rays 3B are reflected from the polarization plane 19a of the beam splitter 19, converted by the convex lens 20 into parallel light, and are transmitted through the spatial modulator 5. As described earlier, the spatial modulator 5 is composed of a ferroelectric liquid crystal panel or the like, and during information reproduction, allows the rays 3B to be transmitted therethrough (without applying modulation), based on an external signal. The light 3C which has been transmitted through the spatial modulator 5 is in accordance with the reproduced information from the interference pattern 13, so that the modulation pattern on the spatial modulator 5 at the time of recording is reproduced as a distribution pattern of optical intensity. By means of a hologram and/or a half mirror, etc., the rays 3C are deflected from their optical paths in the forward path, so as to be led to a photodetector. The detector, which comprises a detection region corresponding to the lattice division pattern of the spatial modulator 5, detects the rays 3C, and reproduces the modulation pattern (page data) at the time of recording.

On the other hand, the remaining component of the reflected rays 3a, i.e., those which have not become diffracted light 3A during propagation within the region 13 of the interference pattern, is transmitted through the information recording medium 11, thereafter converted by the objective lens 10 into parallel light, and enters the joint gyrator 18. In principle, light which is led through the region 18a of the joint gyrator 18 in the forward path and whose polarization direction is thus rotated clockwise by 45° will restore its original polarization direction in the return path, by being led through the region 18b. Similarly, light which is led through the region 18b in the forward path and is thus rotated counterclockwise by 45° will restore its original polarization direction in the return path, by being led through the region 18a. Accordingly, after being led through the joint gyrator 18, the remaining component of the reflected rays 3a reverts to P-polarized light, and is transmitted through the polarization plane 19a of the polarization beam splitter 19, so as to be led to a detector (not shown) via a splitting means such as a hologram. As in the case of information recording, this remaining component of the reflected rays 3a is detected by means of a detector. By using this detection signal, a focusing error signal and a tracking error signal are generated. On the basis of these signals, the objective lens 10 is driven so that the converging point of the rays 3 is controlled so as to follow along the guide grooves on the surface of the reflective layer 11d.

With such a conventional information recording/reproduction apparatus, there have been problems as follows which are associated with information recording and information reproduction.

Specifically, as shown in FIG. 12B, at the time of information recording, some of the reflected rays 3a and some of the reflected rays 3a' are transmitted through the region 13 of the interference pattern. Therefore, in the circle 13a, not only the rays 3 and the rays 3', but also the reflected rays 3a and the reflected rays 3a' exist. The optical intensity of each of the bundle of rays 3, the bundle of rays 3', the bundle of reflected rays 3a, and the bundle of reflected rays 3a' is in inverse proportion with the total area of the rays. Therefore, assuming that the point 12' and the conjugate converging point 12" are each at a distance of d from the reflection surface and that the center of the circle 13a is at a distance of d' from the reflection surface, an optical intensity $I_1$ of the rays 3 is in inverse proportion with $(d')^2$; an optical intensity $I_2$ of the rays 3' is in inverse proportion with $(d-d')^2$; an optical intensity $I_3$ of the rays 3a' is in inverse proportion with $(d+d')^2$; and an optical intensity $I_4$ of the rays 3a is in inverse proportion with $(d')^2$. In the case where d'=d/2, for example, eq. 1 below is true:

$$I_1:I_2:I_3:I_4=1:1:1/9:1 \quad \text{(eq. 1)}.$$

Since the reflectance of the reflective layer 11d never exceeds 100%, the actual optical intensity $I_3$ will be even smaller; however, the optical intensity $I_4$ is still as strong as the optical intensities $I_1$ and $I_2$. Therefore, the interference within the circle 13a is, in effect, interference among three bundles of rays: the rays 3, the rays 3', and the reflected rays 3a. Since the reflected rays 3a serve as noise components, by principle, the conventional information recording/reproduction apparatus allows substantial noise to be contained in the recorded interference fringes.

At the time of information reproduction, as shown in FIG. 14B, any ray 3 entering the circle 13a satisfies the phase matching condition with the interference pattern 13, and therefore generates diffracted light 3A', which may be regarded as originating from an imaginary emission point which is at the point 12'. The diffracted light 3A' has the same polarization state as that of the ray 3 (i.e., the P-polarized ray 3 having been transmitted through the region 18b of the joint gyrator 18 and thus rotated counterclockwise by 45° in polarization direction), and therefore is reflected from the surface of the reflective layer 11d, thus becoming a reflected ray 3A" (shown at the lower half of FIG. 14B). Thereafter, the reflected ray 3A" is converged by the objective lens 10, and transmitted through the region 18b of the joint gyrator 18. As a result of all this, the polarization direction of the reflected ray 3A" has been rotated counterclockwise by 90°; that is, the lower reflected ray 3A" now is S-polarized light.

On the other hand, the diffracted light 3A' which has been produced from any ray 3 entering the circle 13b, which is at a symmetrical position from the circle 13a with respect to the optical axis L, has the same polarization state as that of the ray 3 (i.e., the P-polarized ray 3 having been transmitted through the region 18a of the joint gyrator 18 and thus rotated clockwise by 45° in polarization direction), and therefore is reflected from the surface of the reflective layer 11d, thus becoming a reflected ray 3A" (shown at the upper half of FIG. 14B). Thereafter, the reflected ray 3A" is converged by the objective lens 10, and transmitted through the region 18a of the joint gyrator 18. As a result of all this, the polarization direction of the reflected ray 3A" has been rotated clockwise by 90°; that is, the upper reflected ray 3A" now is S-polarized light.

Therefore, the reflected rays 3A" are reflected from the polarization plane 19a of the beam splitter 19, and follow the same paths as those of the rays 3C, thus being projected onto the photodetector. As a result, the reflected rays 3A" serve as noise components during signal detection.

Moreover, as shown in FIG. 14A, in order for the reflected rays 3a to be transmitted through the interference pattern 13 and generate the diffracted light 3A', it is necessary that the wave fronts of the reflected rays 3a be aligned. However, the reflected rays 3a (as rays 3) have once been led through the circle 13b in the interference pattern 13; during propagation through this region, the reflected rays 3a attain a phase match with the interference pattern 13, as a result of which their wave fronts are disturbed. Therefore, the phase matching condition (i.e., the condition for producing the diffracted light 3A) within the circle 13a is not completely satisfied, so that the optical quality of the generated diffracted light 3A is degraded, resulting in intensity unevenness and phase unevenness. Such degradations in optical quality present themselves as noise components on the photodetector. Thus, with the conventional information recording/reproduction apparatus, the reproduced information also contains noise, thus leading to a degraded information quality.

SUMMARY OF THE INVENTION

In order to overcome the problems described above, preferred embodiments of the present invention provide an information processing device which is capable of suppressing generation of stray light at the time of recording and reproduction of information, thus enabling quality information recording and reproduction.

An information processing device according to the present invention comprises: a radiation light source; and a converging section for converging rays emitted from the light source toward an information recording medium having a photosensitive layer, wherein the converging section splits the rays into first and second rays respectively traveling through first and second spaces as divided by a plane at least containing an optical axis of the rays emitted from the light source, and converges the first and second rays onto first and second points in the information recording medium, the photosensitive layer being interposed between the first and second points, wherein, between the first and second points, the first and second rays interfere with each other to form interference fringes, the interference fringes representing information to be recorded in the photosensitive layer of the information recording medium.

In a preferred embodiment, the first point is closer to the converging section than is the second point, and the first and second rays overlap with each other in a region which is present between the first and second points and is rotation-asymmetric with respect to the optical axis, thus forming the interference fringes.

In a preferred embodiment, the information processing device further comprises a spatial modulator for transmitting or reflecting the first and second rays to cause a change in a portion of the rays entering a region of the spatial modulator during information recording, the change comprising at least one of: a change in light amount; a change in phase; and a change in polarization state.

In a preferred embodiment, the information recording further include a transparent layer, a transparent substrate and a reflective layer. The transparent substrate and the reflective layer sandwiches the photosensitive layer and the transparent layer and are provided on the photosensitive layer side and the transparent layer side, respectively. The first point is located within the transparent substrate, and the second point is located on a reflection surface of the reflective layer.

In a preferred embodiment, the information processing device further comprises: a first light splitting section located between the radiation light source and the converging section, the first light splitting section diffracting light in a predetermined polarization state; a wavelength plate located between the first light splitting section and the information recording medium; and a first photodetector, wherein, a guiding bump or dent structure is provided on the reflection surface of the reflective layer, and reflected light obtained from the second ray being reflected from the reflection surface of the reflective layer travels through the first space and is split and deflected by the first light splitting section so as to enter the first photodetector, and based on a signal obtained by the first photodetector detecting the reflected light, the rays emitted from the light source are controlled so as to follow along the guiding bump or dent structure of the information recording medium while maintaining a predetermined convergence state.

In a preferred embodiment, the information recording medium has a disk shape having a center axis, and the guiding bump or dent structure is formed as a spiral or concentric circles around the center axis.

In a preferred embodiment, the information processing device further comprises a second light splitting section and a second photodetector, wherein, during information reproduction, the information recording medium is positioned so that the first rays are converged at the second point in the information recording medium; reflected light obtained by the first rays reflected from the reflective layer of the information recording medium produces diffracted light by being led through the region of the photosensitive layer in which the interference fringes are formed to produce; and the second light splitting section splits the first rays so as to deflect the diffracted light toward the second photodetector.

In a preferred embodiment, during information reproduction, the spatial modulator blocks the second rays from arriving at the converging section.

In a preferred embodiment, the diffracted light virtually originates from the first point as an imaginary emission point, and travels through the first space.

In a preferred embodiment, a portion of the reflected light obtained by the first rays being reflected from the reflective layer of the information recording medium travels through the second space, and is split and deflected by the first light splitting section so as to enter the first photodetector, and based on a signal obtained by the first photodetector detecting the reflected light, the first rays emitted from the light source are controlled so as to follow along the guiding bump or dent structure of the information recording medium while maintaining a predetermined convergence state.

In a preferred embodiment, the plane dividing the first space from the second space extends perpendicularly to a direction in which the guiding bump or dent structure extends.

In a preferred embodiment, the information recording medium includes a plurality of pits or embossed portions, the plurality of pits or embossed portions being arrayed in a direction perpendicular to the plane dividing the first space from the second space.

In a preferred embodiment, the information processing device further comprises a polygon mirror disposed on an optical path between the second light splitting section and the second photodetector, the polygon mirror having n mirror side faces (where n is an integer equal to or greater than 3) and rotating around a rotation axis, wherein the diffracted light deflected by the second light splitting section is reflected from one of the mirror side faces of the polygon mirror so as to travel toward the second photodetector, and with rotation of the polygon mirror, a brightness and darkness distribution within the deflected diffracted light sweeps over the second photodetector, whereby the brightness and darkness distribution is read by the second photodetector.

In a preferred embodiment, a normal of each of the n mirror side faces of the polygon mirror constitutes a different angle with respect to the rotation axis.

In a preferred embodiment, the converging section includes an objective lens and a parallel plate having opposing first and second principal faces, and a diffraction grating for changing a convergence state of light led through the parallel plate is provided in a region of the first principal face or the second principal face of the parallel plate located in the first space or the second space.

In a preferred embodiment, the converging section includes an objective lens and a parallel plate having opposing first and second principal faces; and a first diffraction grating for changing a convergence state of light led through the parallel plate is provided in a region of the first principal face or the second principal face of the parallel plate located in the first space, and a second diffraction grating for changing a convergence state of light led through the parallel plate is provided in a region of the first principal face or the second principal face of the parallel plate located in the second space, the first diffraction grating and the second diffraction grating providing different light diffraction angles.

In a preferred embodiment, the converging section includes an objective lens having regions respectively located in the first space and the second space, the regions having different curvatures from each other.

Alternatively, an information processing device according to the present invention comprises: a radiation light source; and a converging section for splitting rays emitted from the light source into two bundles of rays respectively traveling through two spaces as divided by a plane containing an optical axis of the rays emitted from the light source, and converging one of the two bundles of rays onto a predetermined converging point, wherein the one of the two bundles of rays is radiated in such a manner that the predetermined converging point is positioned on a reflective layer of an information recording medium carrying information recorded in the form of a three-dimensional interference pattern, and reflected light obtained by the one of the two bundles of rays being reflected from a reflection surface of the reflective layer is led through the three-dimensional interference pattern to produce diffracted light to be detected.

An information recording medium according to the present invention comprises: a transparent layer; a photosensitive layer; a transparent substrate; and a reflective layer, the photosensitive layer and the transparent layer being interposed between the transparent substrate and the reflective layer, and the transparent substrate and the reflective layer being respectively provided on the photosensitive layer side and the transparent layer side, wherein, by means of any of the aforementioned information processing devices, information has been recorded in the form of interference fringes in the photosensitive layer.

An information recording medium according to the present invention comprises: a transparent layer; a photosensitive layer; a transparent substrate; and a reflective layer, the photosensitive layer and the transparent layer being interposed between the transparent substrate and the reflective layer, and the transparent substrate and the reflective layer being respectively provided on the photosensitive layer side and the transparent layer side, wherein, through interference between first convergent light converged at a point in the transparent substrate and second convergent light converged at a point on a face of the reflective layer facing the transparent layer, both points being on a line perpendicular to the reflective layer, a three-dimensional interference pattern of interference fringes has been formed in the photosensitive layer, the three-dimensional interference pattern occupying a region which is rotation-asymmetric with respect to the line, wherein, by modulating the first convergent light or the second convergent light with information to be recorded, the information has been contained in the three-dimensional interference pattern.

In a preferred embodiment, the first convergent light and the second convergent light respectively propagate through two regions as divided by a plane containing the line perpendicular to the reflective layer.

In a preferred embodiment, the information recording medium has a disk shape having a center axis, a plurality of said three-dimensional interference patterns being arranged on the disk, and the information recording medium includes a guiding bump or dent structure which is formed as a spiral or concentric circles around the center axis.

In a preferred embodiment, the plane containing the line perpendicular to the reflective layer extends perpendicularly to a direction in which the guiding bump or dent structure extends.

In a preferred embodiment, the information recording medium has a disk shape having a center axis and including a plurality of pits or embossed portions, the plurality of pits or embossed portions being arrayed in a direction perpendicular to the line perpendicular to the reflective layer.

In accordance with the information processing device of the present invention, at the time of information recording, interference fringes are formed by using substantially two rays to enable hologram recording on an information recording medium. As a result, noise is suppressed, and high-contrast recording is realized. At the time of signal reproduction, the disturbance of the wave fronts of the rays with which an interference pattern is irradiated is reduced. As a result, the resultant diffracted light has a high quality, and occurrence of stray light, which would be superposed on the diffracted light, is suppressed. Thus, an excellent reproduced image can be obtained, and information reading errors can be reduced.

Furthermore, by detecting reproduction light by means of a polygon mirror, information having a two-dimensional distribution can be detected in chronological order, which makes it possible to employ a simplified detector.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1A is an illustration of an information processing device according to a first embodiment of the present invention, showing essential component elements at the time of information recording. FIGS. 1B and 1C show variants of a converging section in the information processing device shown in FIG. 1A.

FIGS. 2A and 2B are diagrams illustrating incident rays and diffracted light within an information recording medium in the case where information is to be recorded by using the information processing device of FIG. 1A.

DETAILED DESCRIPTION OF PREFERRED EMBODIMENTS

Hereinafter, preferred embodiments of the present invention will be described with reference to the accompanying drawings.

First Embodiment

Figure 11:
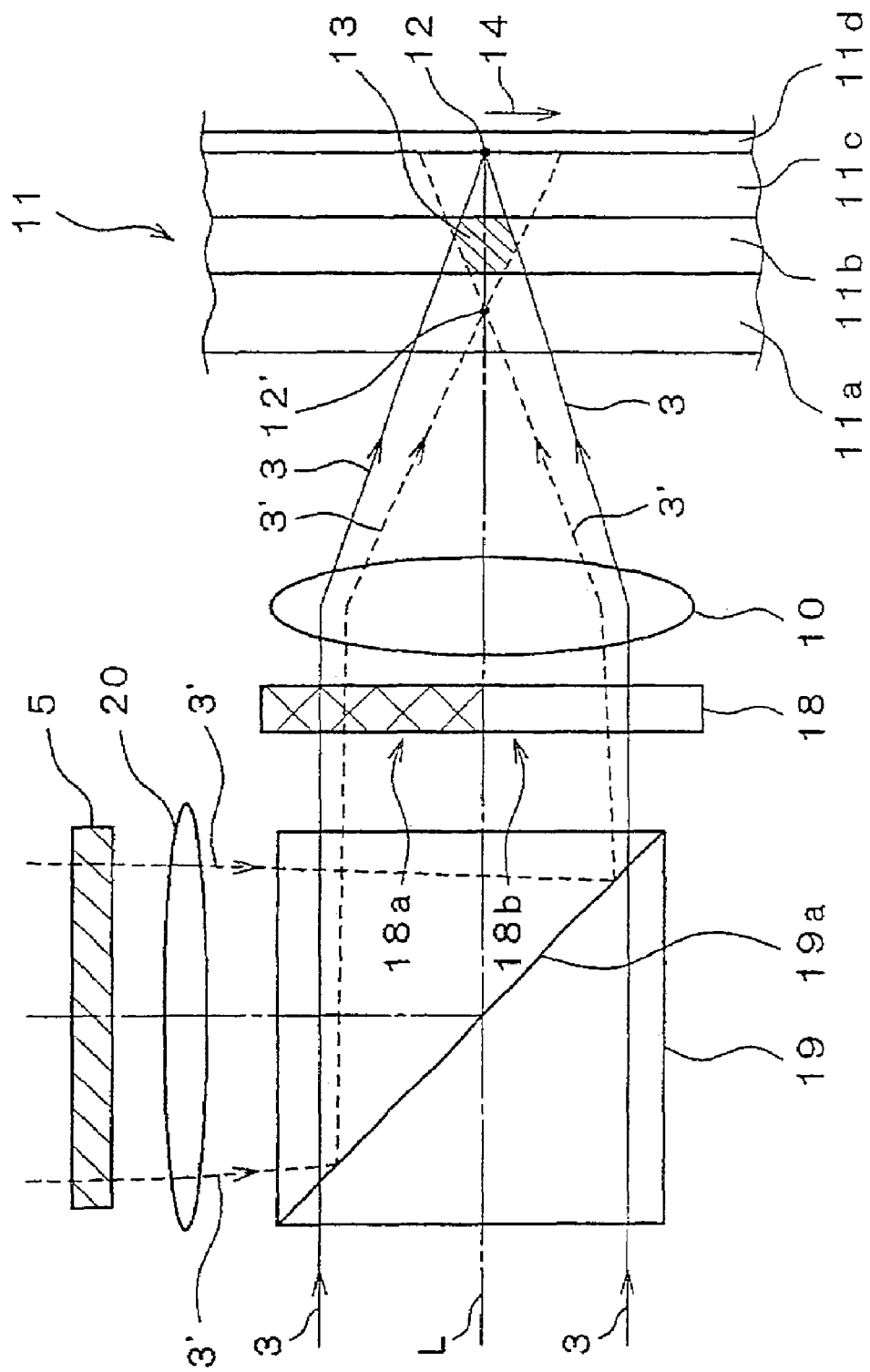
FIG. 11 is an illustration of a conventional information processing device, showing essential component elements at the time of information recording.
Figure 12A:
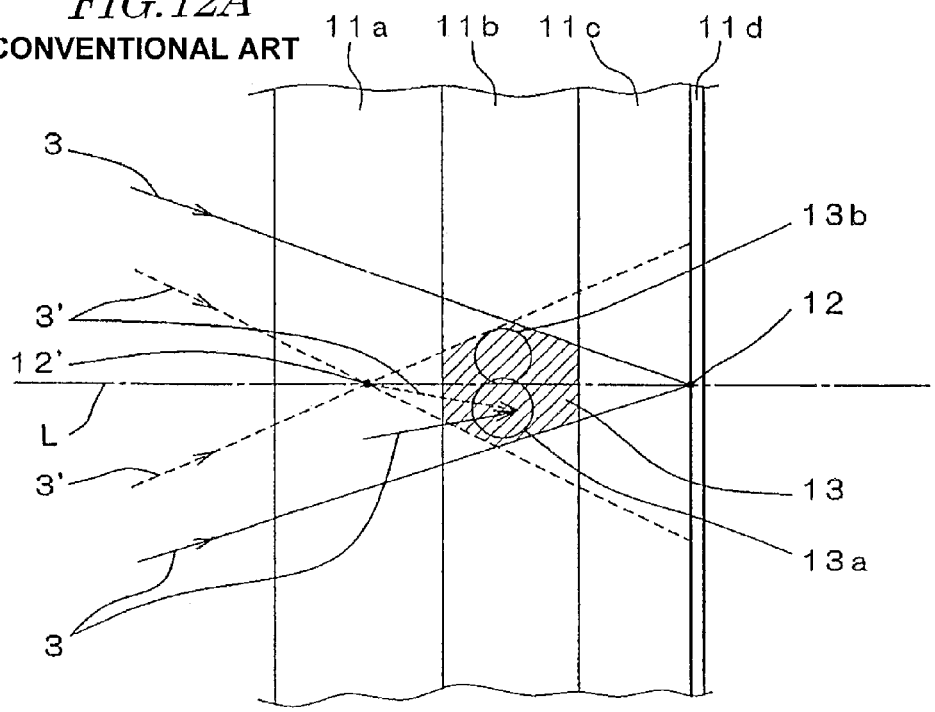
FIGS. 12A and 12B are diagrams illustrating incident rays and diffracted light within an information recording medium in the case where information is to be recorded by using the information processing device of FIG. 11.
Figure 12B:
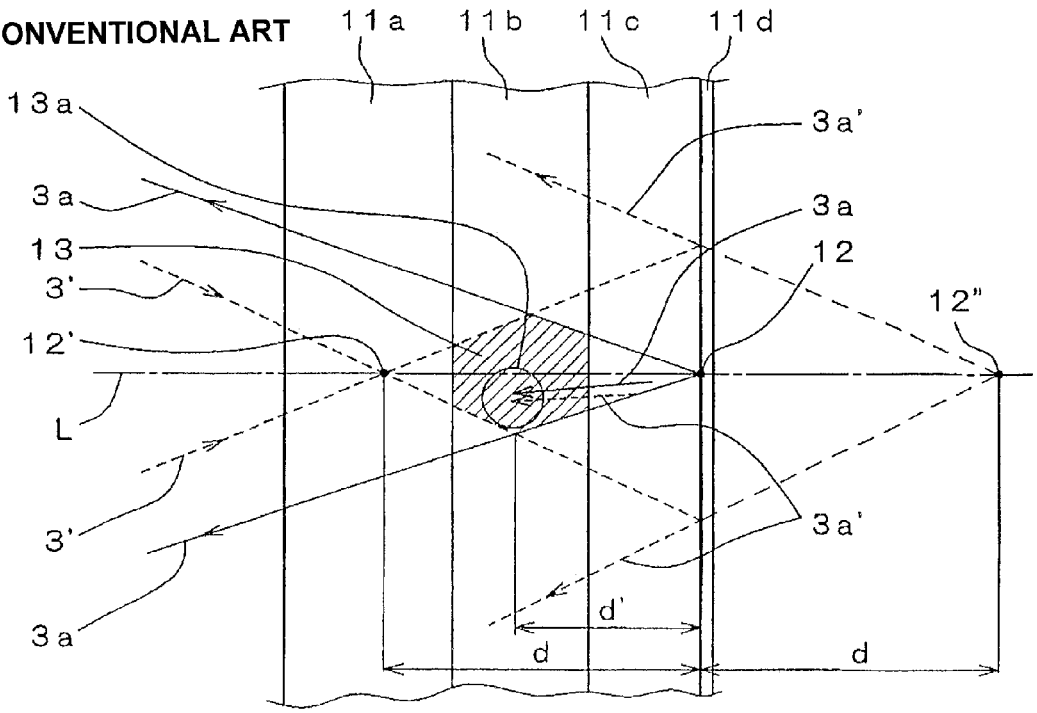
Figure 13:
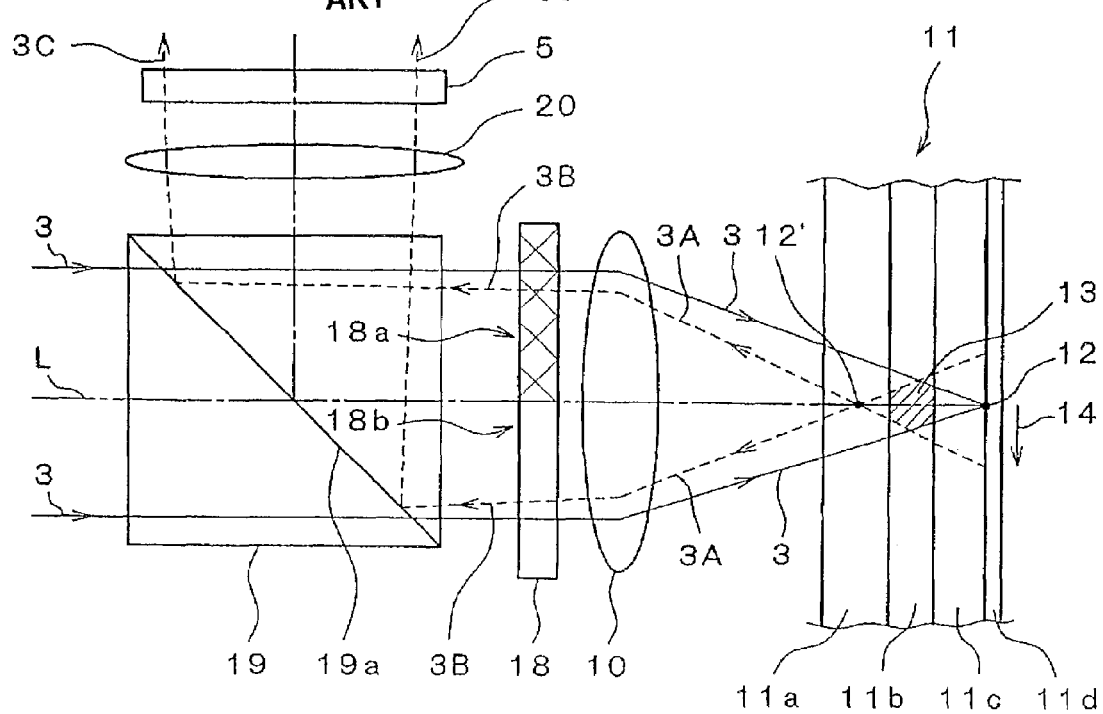
FIG. 13 is an illustration of a conventional information processing device, showing essential component elements at the time of information reproduction.
Figure 14A:
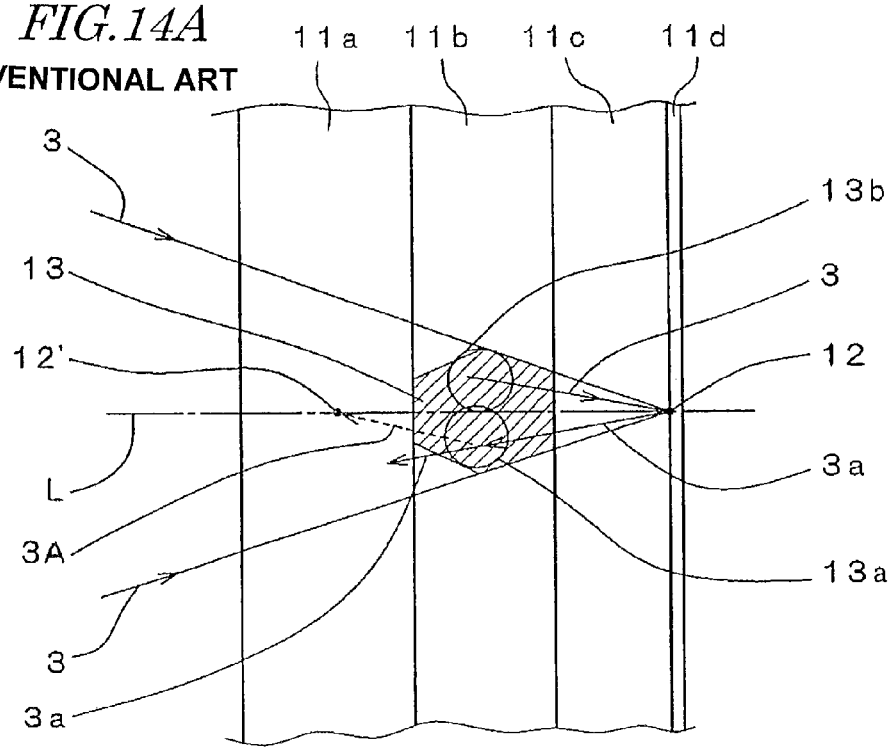
FIGS. 14A and 14B are diagrams illustrating incident rays and diffracted light within an information recording medium in the case where information is to be reproduced by using the conventional information processing device of FIG. 13.
Figure 14B:
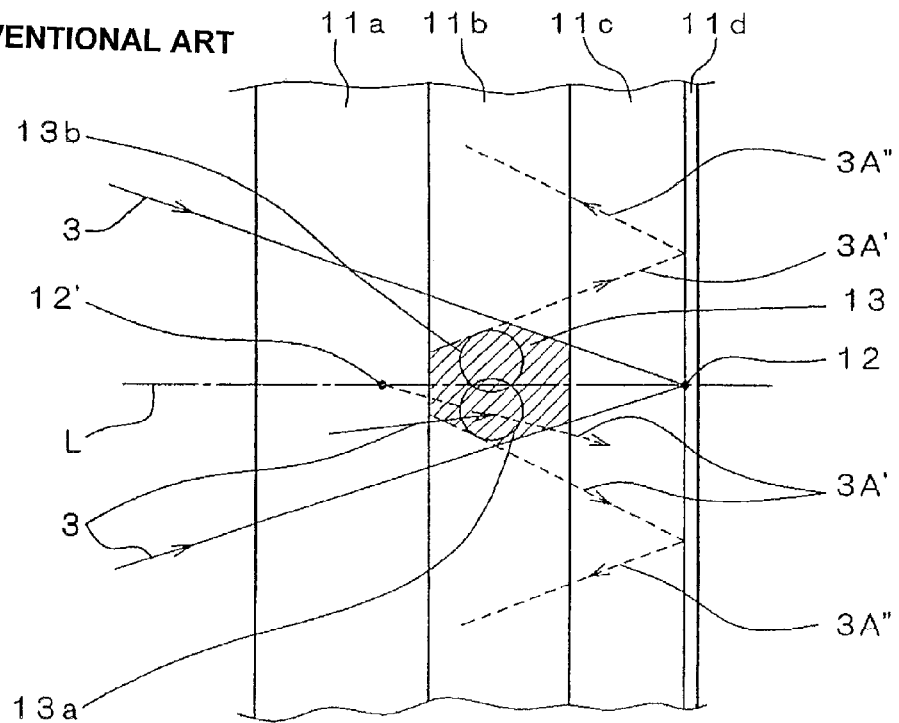

Hereinafter, an information processing device and an information recording medium according to a first embodiment of the present invention will be described. FIG. 1A is an illustration of the information processing device of the present embodiment, showing essential components and recording principles at the time of information recording. Any component elements which are related to those in the conventional information recording/reproduction apparatus shown in FIG. 11 are denoted by the same reference numerals as those used therein.

First, main features of the present invention at the time of information recording will be generally described. As shown in FIG. 1A, the information processing device comprises two main component elements: a radiation light source 2; and a converging section composed of a diffractive lens 8 and an objective lens 10. The information recording medium 11 includes a photosensitive layer 11b, e.g., photopolymer. Rays emitted from the radiation light source 2 are split into a bundle of rays 3' and a bundle of rays 3, which respectively travel through a first space and a second space as divided by a plane containing an optical axis L. In FIG. 1, the first and second spaces respectively correspond to the upper and lower halves as divided by a plane which extends through the optical axis L and is perpendicular to the plane of FIG. 1. The converging section causes the rays 3' and the rays 3 to be converged on two points between which the photosensitive layer 11b of the information recording medium 11 is interposed. Specifically, the converging section causes the rays 3' to be converged at a first point 12' in the information recording medium 11, and causes the rays 3 to be converged at a second point 12 in the information recording medium 11. At the time of information recording, the rays 3' are used as information light, whereas the rays 3 are used as reference light. Therefore, at the time of information recording, the rays 3' and the rays 3 may be referred to as "first rays 3'" and "second rays 3" in the sense that they travel through the first space and the second space, respectively.

An information recording medium 11 includes the photosensitive layer 11b and a transparent layer 11c interposed between a transparent substrate 11a and a reflective layer 11d. The transparent substrate 11a and the reflective layer 11d are provided on the photosensitive layer 11b side and the transparent layer 11c side, respectively. The first point 12' is located within the transparent substrate 11a, whereas the second point 12 is located on the face of the reflective layer 11d facing the transparent layer 11c. At this time, the rays 3' are converged at the first point 12', and thereafter inverted so as to travel through the second space within the photosensitive layer 11b. On the other hand, the rays 3 travel through the second space within the photosensitive layer 11b while being converged toward the second point 12. In a region 13 of the photosensitive layer 11b, the bundle of rays 3' and the bundle of rays 3 overlap with each other and cause interference, thus forming interference fringes. As a result, a three-dimensional interference pattern 13 corresponding to the interference fringes is formed in the photosensitive layer 11b. By applying spatial modulation to the rays 3' or the rays 3 with the information to be recorded, it can be ensured that the resultant interference fringes will contain the information to be recorded. As is clear from FIG. 1, the bundle of rays 3 and the bundle of rays 3' do not overlap with each other until the rays 3' are inverted after being converged at the first point 12'.

The rays 3 are converged at the second point 12, and reflected therefrom. The light which has been reflected from the reflective layer 11d travels through the first space, but does not travel through the second space, which includes the region 13 containing the interference fringes. Therefore, the interference fringes are not susceptible to any reflected light from the reflection surface of the reflective layer 11d, and thus the interference fringes can be recorded on the information recording medium 11 so as to be free of noise components.

Hereinafter, the present embodiment will be described in detail. In addition to the radiation light source 2 and the converging section, the information processing device comprises a light detection substrate 1, a polarizing hologram 4, a spatial modulator 5, a half mirror 6, a collimating lens 7, and a ¼ wavelength plate 9. The radiation light source 2, which is composed of a semiconductor laser or the like, is provided on the light detection substrate 1. As described below, the polarizing hologram 4 and the half mirror 6 respectively function as first and second light splitting sections for splitting light.

P-polarized rays which are emitted from the radiation light source 2 contain rays 3' and rays 3, as divided by the plane containing the optical axis L (described above). The rays 3' and the rays 3 are led through the polarizing hologram 4, the spatial modulator 5, and the half mirror 6, so as to be converted into parallel light by the collimating lens 7.

A region 5a in the spatial modulator 5 through which the rays 3' travel is divided in a lattice fashion, for example, so as to cause an independent change in each split region, including at least one of: a change in the amount of transmitted light; a change in the phase; and a change in the polarization state. Thus, a modulation pattern which represents information to be recorded is established by the spatial modulator 5, thus allowing the rays 3' to be modulated with the information to be recorded. The modulation pattern is to be updated based on an external signal. Although light modulation is also possible in a region 5b in the spatial modulator 5 through which the rays 3 travel, it must be noted that, at the time of information recording, the rays 3 traveling through the region 5b are not to be modulated. The spatial modulator 5 may be composed of e.g. a ferroelectric liquid crystal panel, so as to be capable of changing the phase or amount of transmitted light by varying a voltage applied across the liquid crystal. The spatial modulator 5 may be further combined with another polarization element to cause changes in the polarization state of the transmitted light.

After being transmitted through the spatial modulator 5, the rays 3 are led through the diffractive lens 8, so as to be converted into circularly polarized light by the ¼ wavelength plate 9. Moreover, the rays 3 are converged by the objective lens 10 onto the second point 12, which is on the reflection surface of the reflective layer 11d of the information recording medium 11. On the other hand, the rays 3' are led through the polarizing hologram 4, the spatial modulator 5, and the half mirror 6, so as to be converted into parallel light by the collimating lens 7. Furthermore, the rays 3' are diffracted by the diffractive lens 8, and converted into circularly polarized light by the ¼ wavelength plate 9. Thereafter, the rays 3' are converged by the objective lens 10 onto the first point 12', which is located within the transparent substrate 11a of the information recording medium 11.

The different converging points of the rays 3' and the rays 3 are realized through the presence or absence of a grating on the diffractive lens 8 for generating or not generating diffracted light. Specifically, the diffractive lens 8 is in the form of a plate having two principal faces which are parallel to each other, with a diffraction grating being provided on a surface region 8a which is located within the first space. The diffraction grating may be a grating in the form of concentric circles, with a center axis being the optical axis L. The cross section of the grating may be shaped in sawtooth fashion. The diffraction grating generates $1^{st}$ order diffracted light from the rays 3', while suppressing any other components from being generated. The generated $1^{st}$ order diffracted light are slightly converged as compared to the parallel rays 3'.

For parallel incident light, the objective lens 10 causes the incident light to be converged on a point which is located at a distance m from the objective lens 10. On the other hand, for slightly converged incident light ($1^{st}$ order diffracted light), the objective lens 10 causes the incident light to be converged at a point which is located at a distance m' from the objective lens 10. When recording information on the information recording medium 11, the distance between the information recording medium 11 and the objective lens 10 is adjusted so that the former point coincides with the second point 12 and the latter point coincides with the first point 12' in the information recording medium 11.

On the other hand, on a surface region 8b of the diffractive lens 8 which is located within the second space, no grating is formed. Therefore, the rays 3 travel intact through the diffractive lens 8 without being diffracted, so as to be converged at the second point 12 by the objective lens 10. In this manner, the bundle of rays 3' and the bundle of rays 3 are converged at respectively different positions.

As exemplified in FIG. 1B, not only in the region 8a but also in the region 8b may the diffractive lens 8 include a grating of concentric circles having a sawtoothed cross section, with the optical axis L being a center axis of the concentric circles. In this case, the vertex of each sawtooth is oriented in opposite directions (with respect to the optical axis L) between the region 8a and the region 8b, such that the $1^{st}$ order diffracted light will receive strong diffraction in the region 8a, whereas the $-1^{st}$ order diffracted light will receive strong diffraction in the region 8b. As a result, the first point 12' becomes a conjugate converging point for such diffracted light, with differentiations being made at the point 12. Note that, as shown magnified in the encircled area in FIG. 1B, such a sawtoothed cross section may be approximated by a multitude of steps inscribed in an oblique face of each sawtooth in the cross section. Further note that two such diffraction gratings do not need to be formed on the same face of a plane having parallel principal faces; for example, the grating for the region 8a may be provided on a front face, whereas the grating for the region 8b may be provided on a rear face. Furthermore, the aforementioned grating structure(s) on the diffractive lens 8 may instead be provided on the surface of the objective lens 10. Furthermore, as exemplified in FIG. 1C, the objective lens 10 may be divided into a region 10a which is located within the first space and a region 10b which is located within the second space, and the lens curvature may be differentiated between the region 10a and the region 10b, so that different distances to converging points will be obtained in the respective regions 10a and 10b.

FIG. 2A schematically shows optical paths of light within the information recording medium 11. As shown in FIG. 2A, the rays 3' are inverted at the first point 12', and thereafter travel through the second space. The rays 3 are traveling through the second space, whereas the rays 3' travel through the second space toward the reflective layer 11d. Therefore, in the circle 13a shown in FIG. 2A, the bundle of rays 3 and the bundle of rays 3' overlap with each other. Since the rays 3 and the rays 3' have the same polarization state, these bundles of rays interfere with each other in the second space within the photosensitive layer 11b, thus forming interference fringes. In the case where the output from the radiation light source 2 is large, the photosensitive layer 11b is exposed, whereby a three-dimensional interference pattern 13 having a refractive index distribution corresponding to the optical intensity distribution of the interference fringes is formed. As shown in FIG. 2A, the region 13 of the interference pattern is rotation-asymmetric with respect to the optical axis L of the rays 3 and the rays 3'. As described earlier, the interference pattern 13 varies in accordance with the modulation pattern on the spatial modulator 5.

The information recording medium 11 is mounted to a disk motor, and is rotated in the direction of an arrow 14 shown in FIG. 1. On the surface of the reflective layer 11d, a guiding bump or dent structure, e.g., guide grooves (grating), having periodicity in the radius direction and extending along the direction of rotation are formed with an equal pitch, such that the second point 12 (at which the rays 3 are converged) is controlled so as to follow on a guide groove. In the photosensitive layer 11b above the guide grooves, the aforementioned interference patterns 13 are recorded while being shifted in position but with an overlap with one another.

With the rotation of the information recording medium 11, the converged positions (i.e., the second point 12 and the first point 12') of the rays 3 and the rays 3' also make a relative rotary movement along a plane which is parallel to the guide grooves on the surface of the reflective layer 11d and to the reflective layer 11d. In the case where a spiral guide groove configuration is adopted, it would be possible to cause the converged position 12 of the rays 3 to a "next" guide groove with each rotation. Note that the rotation of the information recording medium 11 is intermittent, such that, during recording (i.e., formation of the interference pattern 13), the information recording medium 11 holds still without rotating. Therefore, the laser output, the update of the modulation pattern, and the rotation of the information recording medium 11 are to be performed in synchronization with a reference signal such as a signal which is generated from, for example, pits or (wobbles of) guide grooves formed on the surface of the reflective layer 11d. Specifically, the output of the laser radiation light source is increased while the rotation of the information recording medium 11 is stopped, thus enabling recording. On the other hand, the modulation pattern to be displayed on the spatial modulator is to be updated while the output of the laser is decreased. As a result, the interference patterns 13 will be rendered on the photosensitive layer of the information recording medium 22 with predetermined intervals in the scanning direction and in the radius direction. Since each interference pattern 13 is formed in a three-dimensional space, it has a high redundancy, so that even if a portion thereof overlaps with an adjoining interference pattern, information can still be properly recorded, and the recorded information can still be properly reproduced.

FIG. 2B schematically shows optical paths of reflected light in the information recording medium 11. The rays 3' are reflected from the reflection surface of the reflective layer 11d to become reflected rays 3a'. The reflected rays 3a' may be regarded as originating from an imaginary emission point which is at a conjugate converging point 12", which in itself is a conjugate image of the first point 12' with respect to the reflection surface. On the other hand, the rays 3 (FIG. 2A) are reflected from the reflection surface of the reflective layer 11d (on which the first point 12 is located), thus becoming inverted reflected rays 3a (FIG. 2B) as shown by solid lines. Since the reflected rays 3a travel through the first space, the reflected rays 3a can travel through the information recording medium 11 without overlapping with the interference pattern 13. Therefore, within the circle 13a, only the reflected rays 3a' exist in addition to the rays 3 and the rays 3'. The optical intensity of each of the bundle of rays 3, the bundle of rays 3', and the bundle of reflected rays 3a' is in inverse proportion with the total area of the rays. Therefore, assuming that the first point 12' and the conjugate converging point 12" are each at a distance of d from the reflection surface and that the center of the circle 13a is at a distance of d' from the reflection surface of the reflective layer 11d, an optical intensity $I_1$ of the rays 3 is in inverse proportion with $(d')^2$; an optical intensity $I_2$ of the rays 3' is in inverse proportion with $(d-d')^2$; and an optical intensity $I_3$ of the rays 3a' is in inverse proportion with $(d+d')^2$. In the case where d'=d/2, for example, eq. 2 below is true:

$$I_1:I_2:I_3=1:1:1/9 \qquad \text{(eq. 2)}.$$

Since the reflectance of the reflective layer 11d never exceeds 100%, the actual optical intensity $I_3$ will become even smaller as compared to the optical intensities $I_1$ and $I_2$, so that the only interference within the circle 13a is, in effect, interference between two bundles of rays: the rays 3 and the rays 3'. Thus, according to the present invention, high-quality interference fringes which have far less noise than in the conventional example can be formed.

As shown in FIG. 1A, the reflected rays 3a go out of the information recording medium 11, and while traveling through the first space, are led through the objective lens 10 and the ¼ wavelength plate 9 so as to be converted into S-polarized parallel light. Furthermore, the reflected rays 3a are diffracted at the region 8a (where the grating is formed) of the diffractive lens 8. Through this diffraction, the reflected rays 3a are made slightly convergent to become reflected rays 3b, which are led through the collimating lens 7 and the half mirror 6 and then enter the spatial modulator 5. A separation film 6a of the half mirror 6 has selective reflection characteristics, depending on the polarization, such that P-polarized light is almost 100% transmitted, while S-polarized light is 10% transmitted and 90% reflected, for example. Therefore, the reflected rays 3b which enter the half mirror 6 in the return path are only partially (e.g., 10%) transmitted through to the spatial modulator 5.

In the case where the spatial modulator 5 is composed of a birefringent material, e.g., a ferroelectric liquid crystal panel, polarization dependence can be imparted to the spatial modulation so that P-polarized light will be spatially modulated but S-polarized light will not be spatially modulated. Based on such polarization dependence, because of being S-polarized light, the reflected rays 3b entering the spatial modulator 5 would be transmitted therethrough without receiving spatial modulation, and thus enter the polarizing hologram 4.

By also employing a birefringent material for the polarizing hologram 4, it can be ensured that P-polarized light is not diffracted (so that the rays 3 in the forward path are transmitted through without being diffracted) but that S-polarized light is diffracted. The reflected rays 3b entering the polarizing hologram 4 will be diffracted because of being S-polarized light, and become reflected rays 3c which enter the surface of the light detection substrate 1. By detecting the reflected rays 3c at the light detection substrate 1, a focusing error signal for the reflective layer 11d and a tracking error signal for the guide grooves are generated. Based on these signals, the objective lens 10 is driven so that the second point 12 (at which the rays 3 are converged) is controlled so as to follow along the guide grooves on the surface of the reflective layer 11d. In other words, the second point 12 is controlled so as to follow the guide grooves while maintaining a predetermined convergence state. In the case where the spatial modulator 5 does not have polarization dependence, the modulation pattern may be temporarily cancelled when updating the modulation pattern, for example (thus resulting in a uniform pattern without modulation), and the reflected rays 3c in this period may be detected at the light detection substrate 1, whereby a focusing error signal for the reflective layer 11d and a tracking error signal for the guide groove can be generated from the rays 3.

Next, information reproduction by the information processing device of the present embodiment will be described.

Figure 3:
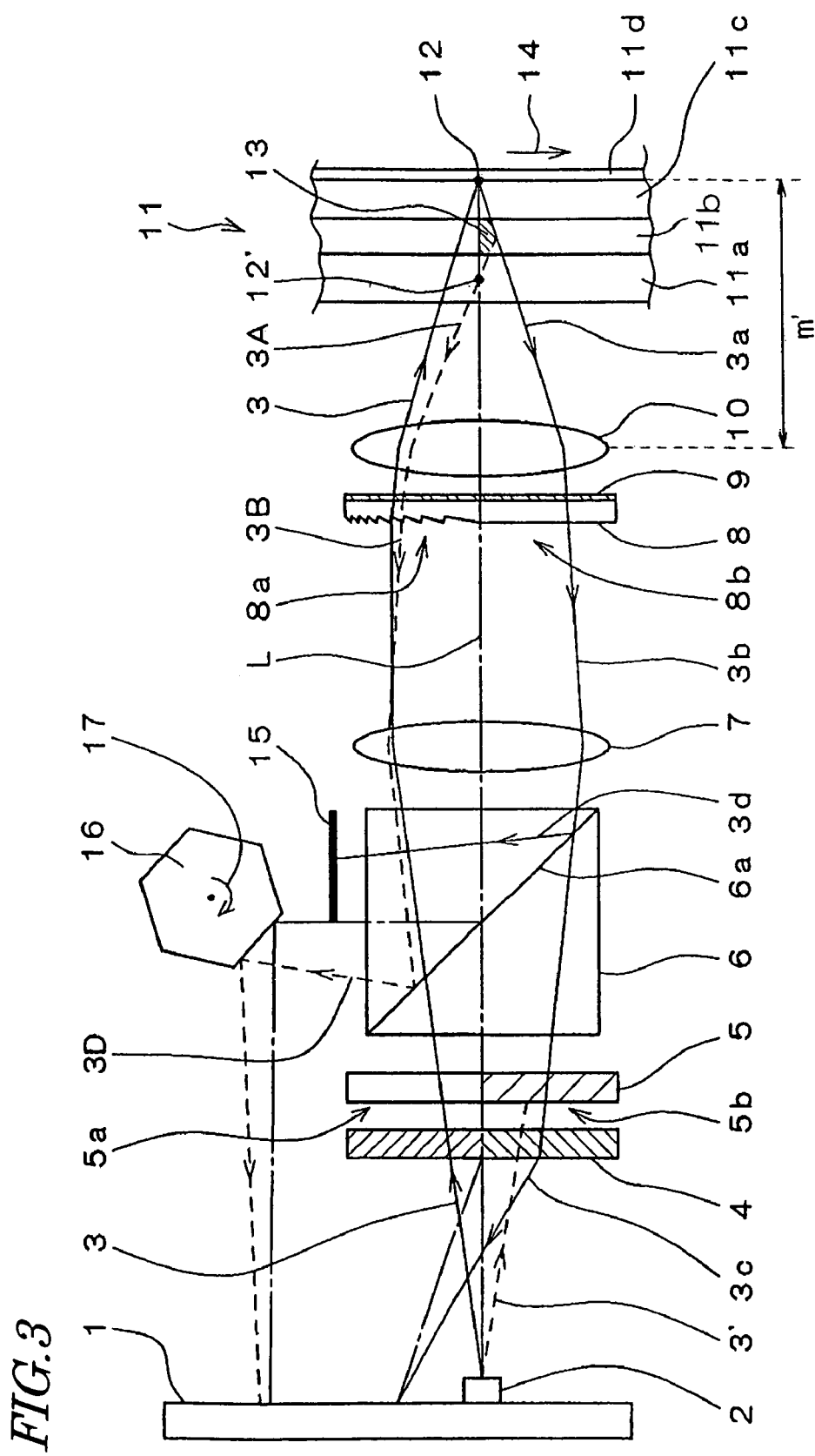
FIG. 3 is an illustration of the information processing device according to the first embodiment of the present invention, showing essential component elements at the time of information reproduction.

FIG. 3 is an illustration of the information processing device of the present embodiment, showing essential components and reproduction principles at the time of signal reproduction. At the time of information reproduction, the modulation pattern on the spatial modulator 5 is differed from that used during the information recording as shown in FIG. 1, such that rays 3 are allowed to travel through the first space as reference light, and are converged at the second point 12 which is located on the reflection surface of the reflective layer 11d of the information recording medium 11. For this purpose, the distance between the information recording medium 11 and the objective lens 10 is changed from that during information recording; that is, the information recording medium 11 is positioned so that the distance between the reflection surface of the reflective layer 11d and the objective lens 10 equals m'. By being reflected from the reflective layer 11d, the rays 3 travel through the second space as rays 3a, and are led through the modulation pattern 13 in the information recording medium 11. At this time, diffraction occurs so that diffracted light 3A which is modulated in accordance with the information recorded in the modulation pattern 13 is generated and travels through the first space.

Thus, since the rays 3 do not travel through the modulation pattern 13 in the information recording medium 11 before being reflected at the reflective layer 11d, the wave fronts of the reflected rays 3a are not disturbed, so that diffracted light with little noise can be obtained.

Hereinafter, with reference to FIG. 3, information reproduction by the information processing device of the present embodiment will be described in more detail. In a manner similar to the case of recording, P-polarized rays which are emitted from the radiation light source 2 are split into a bundle of rays 3 and a bundle of rays 3', which respectively travel through a first space and a second space as divided by a plane containing an optical axis L. In FIG. 3, the first and second spaces respectively correspond to the upper and lower halves as divided by a plane which extends through the optical axis L and is perpendicular to the plane of FIG. 3. At the time of information reproduction, the rays 3 and the rays 3' may be referred to as "first rays 3" and "second rays 3'" in the sense that they travel through the first space and the second space, respectively.

The rays 3 traveling through the first space are led through the polarizing hologram 4, the spatial modulator 5, and the half mirror 6, so as to be converted into parallel light by the collimating lens 7. Furthermore, the rays 3 are diffracted at the region 8a of the diffractive lens 8, converted into circularly polarized light by the ¼ wavelength plate 9, and converged by the objective lens 10 onto the point 12 on the reflection surface of the reflective layer 11d of the information recording medium 11.

On the other hand, the rays 3' traveling through the second space are transmitted through the polarizing hologram 4 but have their optical paths blocked by the spatial modulator 5. As described above, the spatial modulator 5 is composed of e.g. a ferroelectric liquid crystal panel or the like, and its modulation pattern is prescribed so that, at the time of information reproduction, the region 5a (through which the rays 3 travel) allows P-polarized light to be transmitted therethrough but has zero transmittance for S-polarized light, and the region 5b (through which the rays 3' travel) allows S-polarized light to be transmitted therethrough but has zero transmittance for P-polarized light, based on an external signal.

Figure 4:
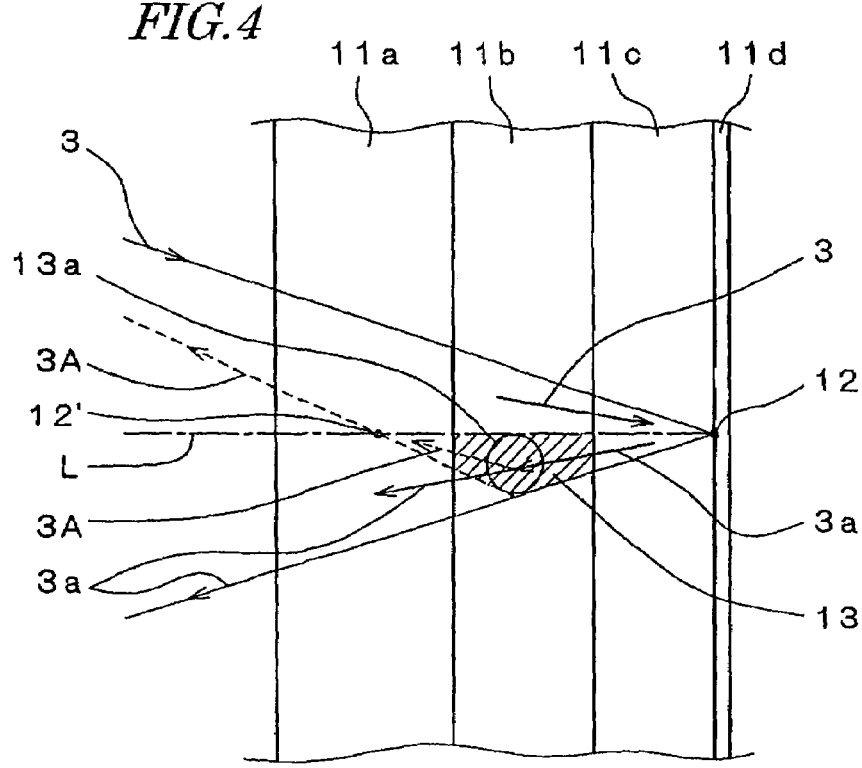
FIG. 4 is a diagram illustrating rays within an information recording medium in the case where information is to be reproduced by using the information processing device of FIG. 3.

FIG. 4 schematically shows optical paths of light within the information recording medium 11. Since the rays 3 travel through the first space, the rays 3 arrive at the reflection surface of the reflective layer 11d without ever passing through the region 13 of the interference pattern, and are reflected at the second point 12, thus being inverted to become reflected rays 3a. The reflected rays 3a enter into the second space, and pass through the interference pattern 13. Since the interference pattern 13 satisfies the phase matching condition with the reflected rays 3a, during propagation through this region, diffracted light 3A is generated from the reflected rays 3a. The diffracted rays 3A are converged at the first point 12', and thereafter are inverted around the optical axis L so as to enter into the first space.

As shown in FIG. 3, the diffracted light 3A is further led through the objective lens 10 and the ¼ wavelength plate 9 to be converted into S-polarized light, and is diffracted at the grating region 8a of the diffractive lens 8. Through this diffraction, the diffracted light 3A becomes slightly divergent rays 3B, and are led through the collimating lens 7, 90% of which is reflected from the reflection surface 6a of the half mirror 6 to become rays 3D. The other component which is transmitted through the reflection surface 6a (which in the present example is 10%) is S-polarized light, and therefore is blocked by the region 5a of the spatial modulator 5.

Among the reflected rays 3a, the remaining component 3a which did not become the diffracted light 3A during propagation through the region 13 of the interference pattern travels through the second space so as to be led through the objective lens 10 and the ¼ wavelength plate 9, thus being converted into substantially parallel S-polarized light. Furthermore, the other component 3a is transmitted through the region 8b of the diffractive lens 8, and after being converged by the collimating lens 7, a portion thereof is transmitted through the half mirror 6 so as to enter the spatial modulator 5. A component 3d which is reflected from the half mirror 6 is blocked by the mask 15. The light entering the spatial modulator 5, which is S-polarized light, is transmitted intact through the region 5b of the spatial modulator 5, and is diffracted at the polarizing hologram 4. These diffracted rays 3c enter the surface of the light detection substrate 1. By detecting the diffracted rays 3c, a focusing error signal for the reflective layer 11d and a tracking error signal for the guide grooves are generated. Based on these signals, the objective lens 10 is driven so that the converging point 12 of the rays 3 is controlled so as to follow along the guide grooves on the surface of the reflective layer 11d.

In order to guide the rays 3D onto the light detection substrate 1, the information processing device further comprises a polygon mirror 16 which is provided on an optical path between the light detection substrate 1 and the half mirror 6. The polygon mirror 16, which is shaped as a prism characterized by a base polygon having n vertices (where n is an integer equal to or greater than 3) and includes n mirror side faces, rotates around a rotation axis. The rays 3D are reflected from a reflection surface of the polygon mirror 16, and enter the surface of the light detection substrate 1. Upon detection of the rays 3D at the light detection substrate 1, the information in the interference pattern 13 is reproduced. With the rotation of a disk motor, the information recording medium 11 is rotated in the direction of an arrow 14 shown in FIG. 3. With the rotation of the disk motor, the converging point 12 of the rays 3 is moved along a guide groove on the surface of the reflective layer 11d. A synchronization signal is obtained from a pit signal or a wobble signal from the guide grooves on the surface of the reflective layer 11d, and the polygon mirror 16 is rotated in synchronization with this signal. The rotation of the disk motor during signal reproduction may be continuous or intermittent. In the case where the rotation is intermittent, the reproduction of the interference pattern 13 is to be performed while the rotation is stopped.

As shown in FIG. 4, the only rays that are present in the circle 13a are the reflected rays 3a. Therefore, the diffracted rays 3A, which are obtained through diffraction at the interference pattern 13, have a high quality. Moreover, with respect to the optical axis L, the reflected rays 3a are inverted in positional relationship from the diffracted rays 3A generated therefrom. Thus, there cannot exist any other rays to overlap the diffracted rays 3A, and thus there is no stray light on the light detection substrate 1, besides the rays 3D.

Moreover, the rays 3 before reflecting from the reflection surface of the reflective layer 11d do not ever pass through the region 13 of the interference pattern, and therefore arrive at the reflection surface without having their wave fronts disturbed, so as to be reflected from this reflection surface and enter the interference pattern 13. Even if the rays 3 were to pass through a region of an adjoining interference pattern (which may have been recorded based on the other one of two adjoining second points 12), the adjoining interference pattern would not satisfy the phase matching condition with the rays 3 traveling toward the second point 12, and therefore the wave fronts of the rays 3 would not be disturbed. Therefore, the reflected rays 3a have a high optical quality as reference light, and the resultant diffracted light 3A also has a high optical quality. As a result, the reproduced image which is formed from the rays 3D on the light detection substrate 1 have an excellent optical quality.

Figure 5:
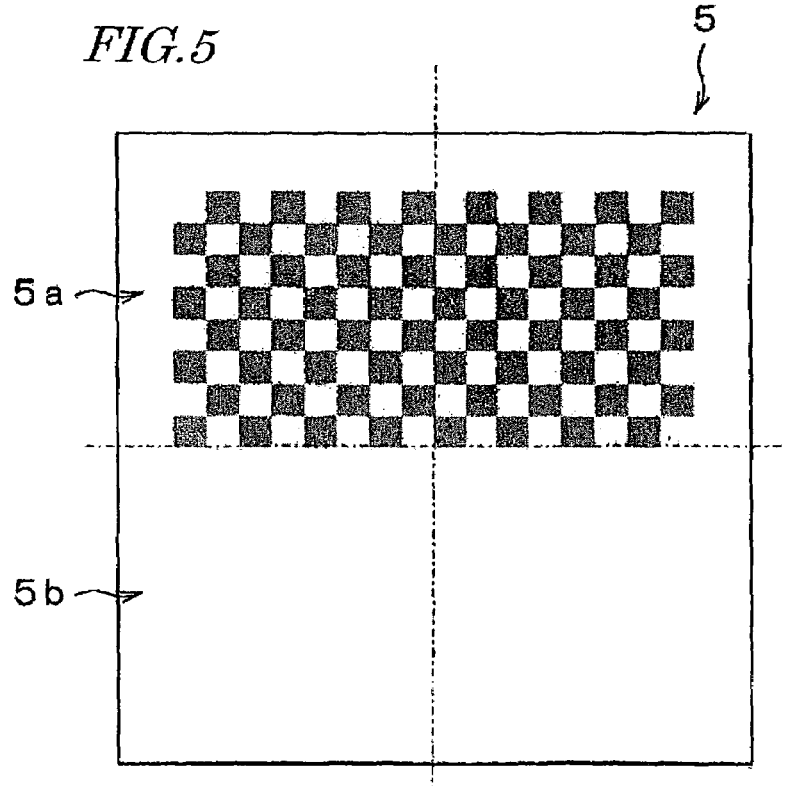
FIG. 5 is a diagram showing a modulation pattern on a spatial modulator used for the information recording according to the first embodiment.

FIG. 5 shows an exemplary modulation pattern formed on the spatial modulator 5 at the time of signal recording. Gray portions represent zero-transmittance portions, whereas white portions represent unmodulated regions (i.e., regions having a transmittance which is sufficiently greater than zero). Alternatively, in each gray portion, a spatial modulation may be performed so as to cause a π phase shift. Although FIG. 5 conveniently illustrates a checker pattern containing alternating gray portions and white portions, it will be appreciated that, in actuality, the gray portions and white portions will have an arrangement which is based on page data representing predetermined information.

Figure 6:
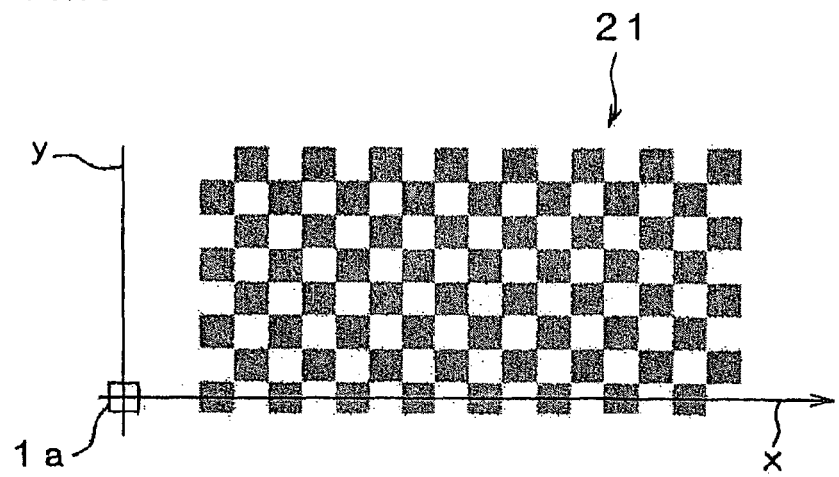
FIG. 6 is a diagram showing a reproduced image on a detection surface of a photodetector during information reproduction according to the first embodiment.

FIG. 6 shows a reproduced image 21 on the light detection substrate 1 formed at the time of signal reproduction in the present embodiment. Gray portions correspond to regions with zero light amounts, whereas white portions correspond to regions with a non-zero light amount. As a scaled image, the light amount distribution immediately after transmission through the spatial modulator 5 of FIG. 5 is reproduced. A square photodetector 1a on the light detection substrate 1 is sized so as to be equal to or slightly smaller than a single square pattern (a gray or white portion) in the light distribution. When the polygon mirror 16 is rotated (in the direction of an arrow 17 in FIG. 3 and around an axis which is perpendicular to the plane of FIG. 17), a change in the tilt of the mirror side face which is irradiated with the rays 3D occurs. Based on the change in the tilt of the mirror side face, the entire reproduced image 21 is moved in an −x direction, as a result of which the photodetector 1a undergoes a relative movement in an x direction. Thus, each square pattern in the reproduced image 21 is consecutively detected in the x direction.

Each of the n mirror side faces (FIG. 3 illustrates an example where n=6) of the polygon mirror 16 constitutes a different tilt angle with respect to the rotation axis. In other words, the normal of each mirror side face constitutes a different angle with respect to the rotation axis. Therefore, when the rotation proceeds until the rays 3D begin to be reflected from a next mirror side face, the photodetector 1a "returns" to the original position along the x axis, but is shifted by one unit (corresponding to the width of a single gray square portion) in a y direction, in accordance with the difference in the tilt angles of the mirror side faces. Then, in the aforementioned manner, the photodetector 1a will consecutively undergo each relative movement in the x direction with the rotation of the polygon mirror 16.

By repeating the above operation a number of times equal to the number of mirror side faces, the photodetector 1a is allowed to scan every gray square portion and every white square portion on the detection surface 1. As a result, the reproduced image 21 having a spatial order can be translated into signals of chronological order (relative largeness or smallness of the detected light amount). The determination of the relative largeness or smallness of the detected light amount is made in synchronization with a signal which is generated in accordance with the angle of rotation of the polygon mirror 16. Thus, according to the present embodiment, since a reproduced image having a spatial order is translated into signals of chronological order, the number of photodetectors can be drastically reduced and also the wiring and the like can be simplified, thus providing a detection method which is much less expensive than that used conventionally.

Figure 7:
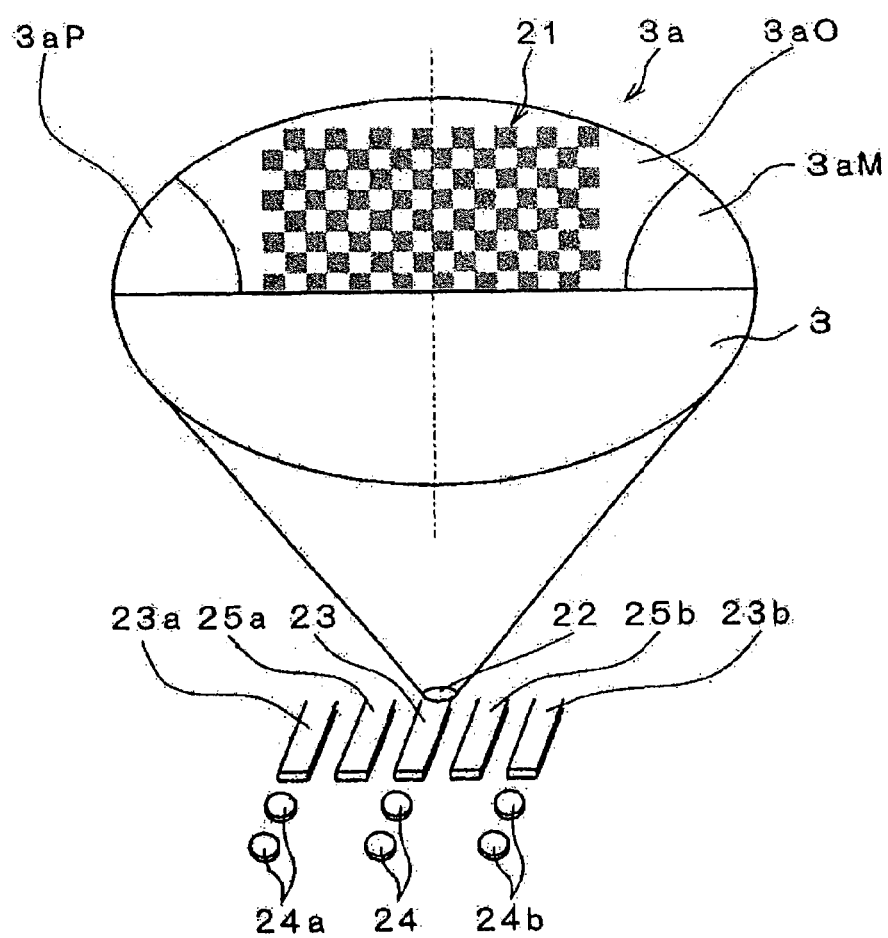
FIG. 7 is a diagram illustrating a relationship between the structure of an information recording medium and reflected light at the time of information reproduction according to the first embodiment.

FIG. 7 is a diagram illustrating a relationship between guide grooves and reflected light at the time of signal reproduction. A light spot 22 which is created by the rays 3 (which fill the lower half of the encircled area in FIG. 7) being converged on the reflection surface of the reflective layer 11d is controlled to be on a guide groove 23 (or 23a, 23b). The guide grooves 23, 23a, and 23b are formed with an equal period, with dummy grooves 25a and 25b interposed therebetween. On the extensions (along the disk rotation direction) of the guide grooves 23, 23a, and 23b, sequences of address signals 24, 24a, and 24b, which are in the form of embossed portions or pits, are formed, respectively. Each of the sequences of address signals 24, 24a, and 24b is formed in a region away from the corresponding guide groove, after a predetermined interval (guide groove) in the disk rotation direction; a plurality of such regions exist in the course of one rotation of the disk. The reflection from such periodic guide grooves causes groove diffraction in the disk radius direction, such that the reflected rays 3a (which fill the upper half of the encircled area in FIG. 7) have the $1^{st}$ order diffracted light 3aP and the $-1^{st}$ order diffracted light 3aM superposed on the $0^{th}$ order diffracted light 3aO. The $1^{st}$ order diffracted light 3aP and the $-1^{st}$ order diffracted light 3aM are diffraction-separated in the disk radius direction, with a separation amount which can be uniquely determined based on the radius direction pitch of the periodic grooves (including both the guide grooves and the dummy grooves).

Since the guide groove pitch (i.e., the interspace between 23 and 23a, or between 23 and 23b) is set to be a relatively broad distance (e.g., about three to four times the wavelength) in order to conserve the reproduction quality of the diffraction reproduced image 21, if the dummy grooves were not provided, the $1^{st}$ order diffracted light 3aP might be located closer to, and even overlap with, the $-1^{st}$ order diffracted light 3aM. In the present embodiment, however, since the dummy grooves 25a and 25b are interposed between the guide grooves, the separation amount between the $1^{st}$ order diffracted light 3aP and the $-1^{st}$ order diffracted light 3aM is increased, and it is also possible to adjust the separation amount based on the number of dummy grooves to be interposed. Therefore, the diffraction image 21 is reproduced only from the wave fronts of the $0^{th}$ order diffracted light 3aO, so that diffraction disturbance (i.e., mixing of the $1^{st}$ order diffracted light 3aP and the $-1^{st}$ order diffracted light 3aM) at the guide grooves can be eliminated, thus enabling clear reproduction with little noise. Note that, other than in the form of embossed portions or pits, the address signals may be obtained from a wobble (i.e., undulation in the disk radius direction) signal from the guide grooves.

Second Embodiment

Figure 8:
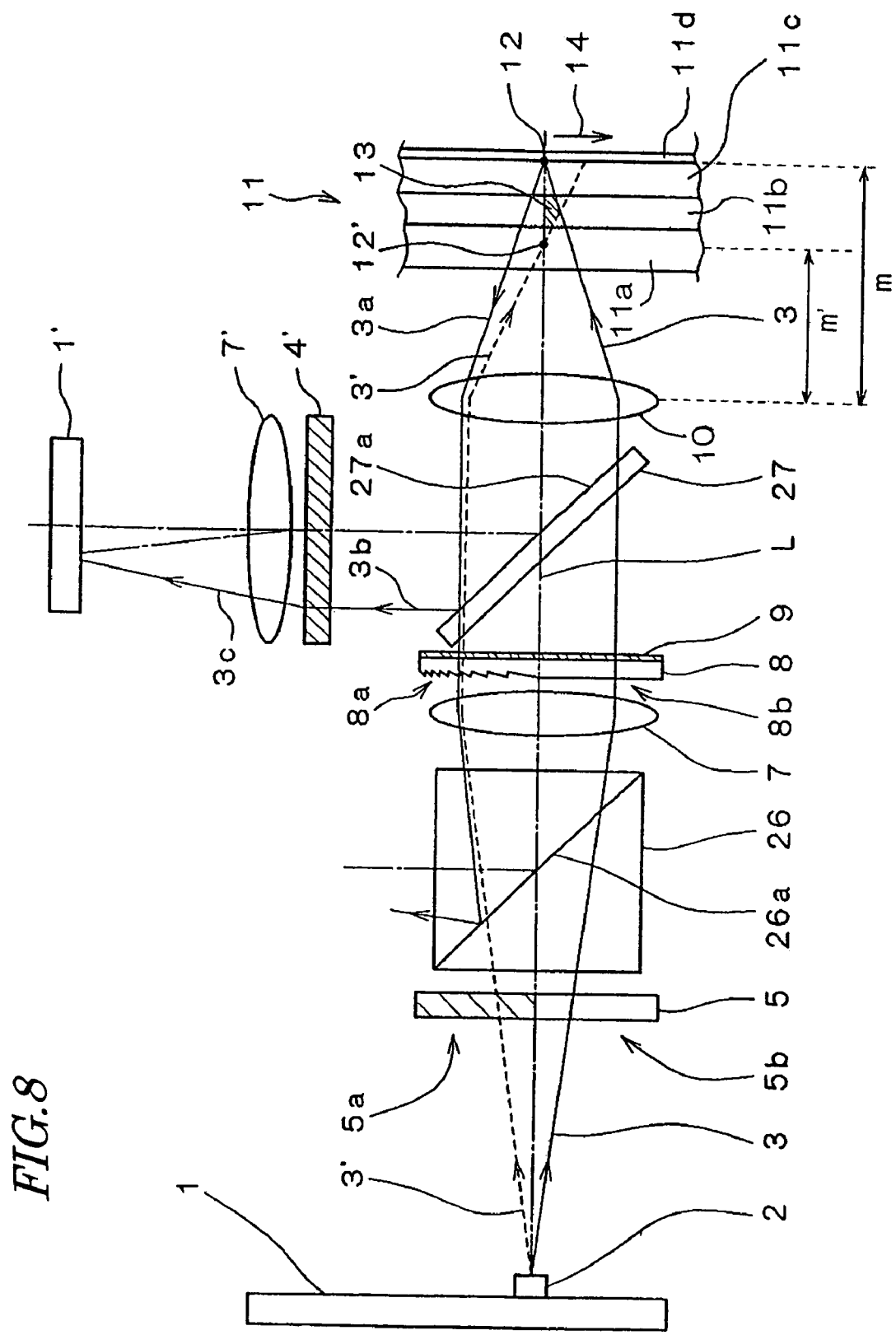
FIG. 8 is an illustration of an information processing device according to a second embodiment of the present invention, showing essential component elements at the time of information recording.
Figure 9:
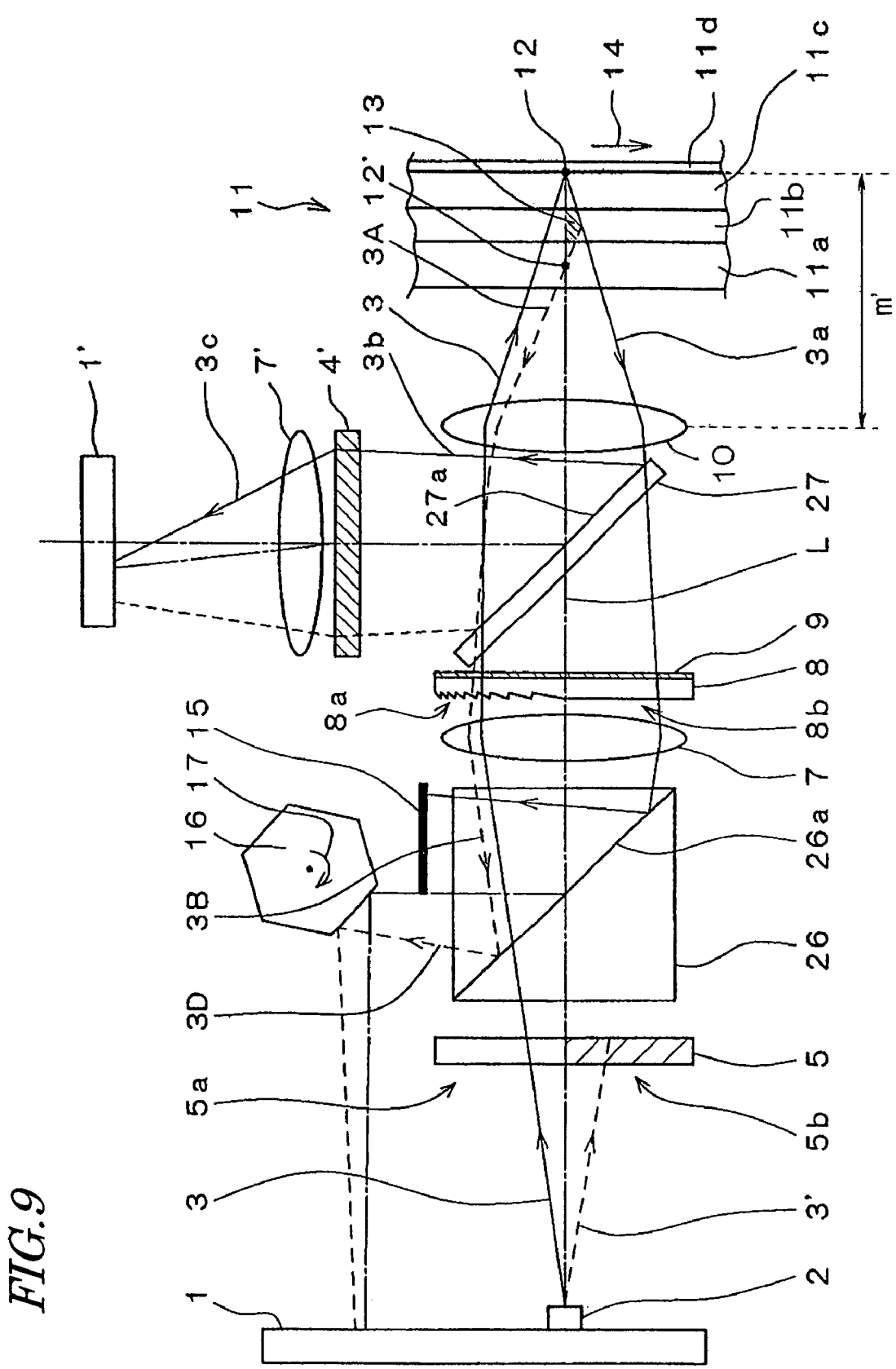
FIG. 9 is an illustration of the information processing device according to the second embodiment of the present invention, showing essential component elements at the time of information reproduction.
Figure 10A:
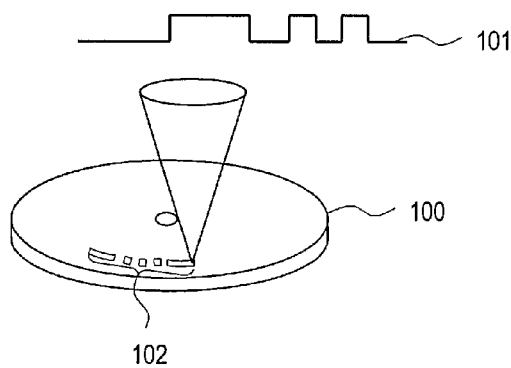
FIGS. 10A and 10B are schematic diagrams illustrating, respectively, a conventional optical apparatus (e.g., DVD) and a conventional hologram recording apparatus.
Figure 10B:
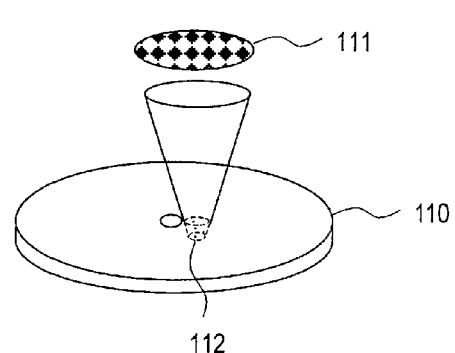

With reference to FIGS. 8 and 9, an information processing device according to a second embodiment of the present invention will be described. In the second embodiment as illustrated in FIGS. 8 and 9, any component elements which are identical to those in the first embodiment are denoted by the same reference numerals as those used therein. The present embodiment only differs from the first embodiment with respect to the placement of some of the component elements, while the optical paths of rays within the information recording medium 11 and the principles of information recording and reproduction are the same.

FIG. 8 is an illustration of the information processing device of the present embodiment, showing essential components and reproduction principles at the time of signal recording. The optical paths of rays within the information recording medium 11 are as described in the first embodiment with reference to FIGS. 2A and 2B.

As shown in FIG. 8, P-polarized rays which are emitted from the radiation light source 2 (e.g., a semiconductor laser) mounted on the light detection substrate 1 are split into a bundle of rays 3' and a bundle of rays 3, which respectively travel through a first space and a second space as divided by a plane containing an optical axis L. In FIG. 9, the first and second spaces respectively correspond to the upper and lower halves as divided by a plane which extends through the optical axis L and is perpendicular to the plane of FIG. 9. As in the first embodiment, at the time of recording, the rays 3 are employed as reference light, whereas the rays 3' are employed as information light.

The rays 3 are transmitted through the spatial modulator 5 and the polarization beam splitter 26 (where the polarization beam splitter 2 allows P-polarized light to be 100% transmitted therethrough, while causing S-polarized light to be 100% reflected), and converted into parallel light by the collimating lens 7. Furthermore, the rays 3 are led through the diffractive lens 8, and converted into circularly polarized light by the ¼ wavelength plate 9. Moreover, after being led through the half mirror 27 (where the half mirror 27 may cause e.g. 90% transmission and 10% reflection irrespective of polarization), the rays 3 are converged by the objective lens 10 onto a second point 12 on the reflection surface of the reflective layer 11d of the information recording medium 11.

In the present embodiment, too, the diffractive lens 8 and the objective lens 10 together compose a converging section. As described in the first embodiment, however, the converging section may alternatively have a structure as shown in FIG. 1B or FIG. 1C.

On the other hand, the rays 3' are led through the spatial modulator 5 and the polarization beam splitter 26, converted into parallel light by the collimating lens 7, diffracted by the diffractive lens 8, and converted into circularly polarized light by the ¼ wavelength plate 9. Furthermore, after being transmitted through the half mirror 27, the rays 3' are converged by the objective lens 10 onto a first point 12', which is before the reflective layer 11d of the information recording medium 11.

On the surface of the diffractive lens 8, a diffraction grating is provided in a region 8a which is located within the first space and entered by the rays 3', the diffraction grating being in the form of concentric circles (with a center axis being the optical axis L) and having a sawtoothed cross section. The diffraction grating generates $1^{st}$ order diffracted light from the rays 3' toward the side of convergence as imparted by the grating, while suppressing any components other than the $1^{st}$ order diffracted light from being generated. On the other hand, since no grating is formed in a surface region 8b entered by the rays 3, the rays 3 travel intact through the region 8b without being diffracted. The different converging points of the rays 3 and the rays 3' are realized through the presence or absence of such diffraction.

As in the first embodiment, the information recording medium 11 includes a transparent substrate 11a, a photosensitive layer 11b (e.g., photopolymer), a transparent layer 11c, and a reflective layer 11d, such that the photosensitive layer 11b is located substantially in the middle between the second point 12 and the first point 12'.

The spatial modulator 5 has a structure similar to that described in the first embodiment, and modulates the light transmitted therethrough in accordance with an external signal. As described in the first embodiment, during recording and reproduction, the spatial modulator 5 functions to block part of the rays emitted from the radiation light source 2 and block part of reflected light.

As has been described in the first embodiment with reference to FIG. 2A, past the first point 12', the rays 3' enter into the second space which is traveled through by the rays 3, and arrive at the reflective layer 11d. Therefore, in the circle 13a shown in FIG. 2A, the bundle of rays 3 and the bundle of rays 3' intersect or overlap each other. Since the rays 3 and the rays 3' have the same polarization state, once entering the photosensitive layer 11b after being led through the transparent substrate 11a, these two bundles of rays interfere with each other, thus forming interference fringes. In the case where the output from the laser light source is large, the photosensitive layer 11b is exposed, whereby an interference pattern 13 is formed. The interference pattern 13 varies in accordance with the modulation pattern on the spatial modulator 5.

The information recording medium 11 is mounted to a disk motor, and is rotated in the direction of an arrow 14 shown in FIG. 8. On the surface of the reflective layer 11d, guide grooves (grating) having periodicity in the radius direction and extending along the direction of rotation are formed with an equal pitch, such that the second point 12 (at which the rays 3 are converged) is controlled so as to follow on a guide groove. Therefore, with the rotation of the information recording medium 11, the converged positions of the rays 3 and the rays 3' also make a relative rotary movement along a plane which is parallel to the guide grooves on the surface of the reflective layer 11d and to the reflective layer 11d. In the case where a spiral guide groove configuration is adopted, it would be possible to cause the converged position 12 of the rays 3 to a "next" guide groove with each rotation.

On the other hand, as shown in FIG. 2B, the rays 3' are reflected from the reflection surface of the reflective layer 11d to become reflected rays 3a' (shown by broken lines), which may be regarded as originating from an imaginary emission point which is at a conjugate converging point 12" (which in itself is a conjugate image of the first point 12' with respect to the reflection surface). The rays 3 are reflected from the reflection surface of the reflective layer 11d, upon which the second point 12 is located, to become inverted reflected rays 3a (shown by solid lines). The reflected rays 3a are transmitted through the information recording medium 11 without overlapping the interference pattern 13. Therefore, within the circle 13a, only the reflected rays 3a' exist in addition to the rays 3 and the rays 3'. The optical intensity of each of the bundle of rays 3, the bundle of rays 3', and the bundle of reflected rays 3a' is in inverse proportion with the total area of the rays. Therefore, assuming that the first point 12' and the conjugate converging point 12" are each at a distance of d from the reflection surface and that the center of the circle 13a is at a distance of d' from the reflection surface of the reflective layer 11d, an optical intensity $I_1$ of the rays 3 is in inverse proportion with $(d')^2$; an optical intensity $I_2$ of the rays 3' is in inverse proportion with $(d-d')^2$; and an optical intensity $I_3$ of the rays 3a' is in inverse proportion with $(d+d')^2$. In the case where d'=d/2, for example, the aforementioned eq. 2 below is true. Since the reflectance of the reflective layer 11d never exceeds 100%, the actual optical intensity $I_3$ will become even smaller, so that the only interference within the circle 13a is, in effect, interference between two bundles of rays: the rays 3 and the rays 3'. Thus, as in the first embodiment, high-quality interference fringes which have far less noise than in the conventional example can be formed.

As shown in FIG. 8, after being transmitted through the information recording medium 11, the reflected rays 3a are converted into parallel rays by the objective lens 10, and a portion thereof (e.g., 10%) is reflected from a reflection surface 27a of the half mirror 27 to become rays 3b. The rays 3b are diffracted by a hologram 4', and converged by a collimating lens 7', thus becoming rays 3c to enter the surface of a photodetector 1'. By detecting the rays 3c, a focusing error signal for the reflective layer 11d and a tracking error signal for the guide grooves are generated. Based on these signals, the objective lens 10 is driven so that the second point 12 is controlled so as to follow along the guide grooves on the surface of the reflective layer 11d.

On the other hand, among the reflected rays 3a, the component which is transmitted through the reflection surface 27a of the half mirror 27 is led through the ¼ wavelength plate 9 so as to be converted into S-polarized parallel light. Then, after being diffracted at the grating region 8a of the diffractive lens 8, all light is reflected from a polarization plane 26a of the polarization beam splitter 26.

Next, with reference to FIG. 9, the essential components of the information processing device at the time of information reproduction will be described. As in the first embodiment, at the time of information reproduction, the rays 3 travel through the first space as reference light. As shown in FIG. 9, the rays 3 emitted from the radiation light source 2 are led through the spatial modulator 5 and the polarization beam splitter 26. Furthermore, the rays 3 are led through the collimating lens 7 and diffracted at the region 8a of the diffractive lens 8, thus becoming slightly divergent light. The rays 3 are converted into circularly polarized light by the ¼ wavelength plate 9, led through the half mirror 27, and enter the objective lens 10 so as to be converged at the second point 12 on the reflection surface of the reflective layer 11d of the information recording medium 11. On the other hand, the rays 3' have their optical paths blocked by the spatial modulator 5.

As has been described with reference to FIG. 4, since the rays 3 propagate through the first space, the rays 3 arrive at the reflection surface of the reflective layer 11d without passing through the region 13 of the interference pattern, and are inverted after reflection from the second point 12, thus becoming reflected rays 3a. Thereafter, the reflected rays 3a enter into the second space, so as to pass through the interference pattern 13. Since the interference pattern 13 satisfies the phase matching condition with the reflected rays 3a, during propagation through this region, diffracted light 3A is generated from the reflected rays 3a. The diffracted rays 3A are converged at the first point 12', and thereafter are inverted around the optical axis L, converged by the objective lens 10, and transmitted through the half mirror 27 and the ¼ wavelength plate 9 to be converted into S-polarized light. Furthermore, the rays 3A are further diffracted at the grating region 8a of the diffractive lens 8. Through this diffraction, the rays 3A become slightly divergent light, and are transmitted through the collimating lens 7, all of which light is reflected from the polarization plane 26a of the polarization beam splitter 26 to become rays 3D. Among the diffracted rays 3A, the component which is reflected from the reflection surface 27a of the half mirror 27 are led through the hologram 4' and the collimating lens 7', toward the photodetector 1'. However, since the rays 3D form a relatively large light spot on the detection surface of the photodetector 1', there is little influence on the detection of a focusing error signal and a tracking error signal described later.

Among the reflected rays 3a, the component 3a which did not become diffracted light during propagation through the region 13 of the interference pattern is converged by the objective lens 10, and thereafter a portion thereof (e.g., 10%) is reflected from the reflection surface 27a of the half mirror 27 to become rays 3b. The rays 3b are diffracted by the hologram 4', converged by the collimating lens 7', thus becoming rays 3c to enter the surface of the photodetector 1'.

By detecting the rays 3c at the photodetector 1', a focusing error signal for the reflective layer 11d and a tracking error signal for the guide grooves are generated. Based on these signals, the objective lens 10 is driven so that the second point 12 (at which the rays 3 are converged) is controlled so as to follow along the guide grooves on the surface of the reflective layer 11d.

On the other hand, among the reflected rays 3a, the remaining component which is transmitted through the reflection surface 27a of the half mirror 27 is led through the ¼ wavelength plate 9 so as to be converted into S-polarized light. Then, after being diffracted at the region 8b of the diffractive lens 8 and led through the collimating lens 7, all light is reflected from the polarization plane 26a of the polarization beam splitter 26, and blocked by the shielding mask 15.

The rays 3D are reflected from the reflection surface of the polygon mirror 16, and enter the surface of the light detection substrate 1. Upon detection of the rays 3D at the light detection substrate 1, the information in the interference pattern 13 is reproduced. With the rotation of a disk motor, the information recording medium 11 is rotated in the direction of an arrow 14 shown in FIG. 9. With the rotation of the information recording medium 11 in the direction of the arrow 14, the second point 12 (which is the converged position of the rays 3) is moved along a guide groove on the surface of the reflective layer 11d. A synchronization signal is obtained from a pit signal or a wobble signal from the guide grooves on the surface of the reflective layer 11d by means of the photodetector 1', and the polygon mirror 16 is rotated in synchronization with the synchronization signal. The rotation of the disk motor during signal reproduction may be continuous or intermittent. In the case where the rotation is intermittent, the reproduction of the interference pattern 13 is to be performed while the rotation is stopped.

In the present embodiment, as has been described with reference to FIG. 4, the only rays that are present in the circle 13a are the reflected rays 3a. Therefore, the diffracted rays 3A, which are obtained from the reflected rays 3a propagating through the interference pattern 13, have a high quality. Moreover, with respect to the optical axis L, the reflected rays 3a are inverted in positional relationship from the diffracted rays 3A generated therefrom. Thus, there cannot exist any other rays to overlap the diffracted rays 3A, and thus there is no stray light on the photodetector 1, besides the rays 3D.

Since the rays 3 do not travel through the region 13 of the interference pattern before being reflected at the reflective surface, the rays 3 arrive at the reflection surface without their wave fronts being disturbed, and then reflected from this surface and enter the interference pattern 13. Even if the rays 3 were to pass through a region of an adjoining interference pattern (which may have been recorded based on the other one of two adjoining second points 12), the adjoining interference pattern would not satisfy the phase matching condition with the rays 3, and therefore the wave fronts of the rays 3 would not be disturbed. Therefore, the reflected rays 3a have a high optical quality as reference light, and the resultant reproduction light (diffracted light 3A) also has a high optical quality. As a result, as in the first embodiment, the reproduced image which is formed from the rays 3D on the photodetector 1 have an excellent optical quality.

As has been described in the first embodiment with reference to FIGS. 5 to 7, the present embodiment also enables recording of information to the information recording medium 11 and reproduction of information which is recorded on the information recording medium 11, and effects which are similar to those of the first embodiment can be obtained.

Although the first and second embodiments above illustrate exemplary structures in which a light source and a photodetector are integrated as one unit, it will be appreciated that the two may instead be separate components. Although the first and second embodiments adopt a light detection method which employs a polygon mirror to translate a reproduced image having a spatial order into signals of chronological order, the entire reproduced image 21 shown in FIG. 6 may alternatively be detected by means of a photodetection device comprising a two-dimensional array of photodetectors. Moreover, the diffractive lens in the first embodiment may be implemented in the same holder as the objective lens, so that the two elements are driven in an integral manner.

Although the first and second embodiments above do not offer any detailed discussion of the focus detection technique or the tracking detection technique, these techniques may be, for example, an SSD technique (Spot Size Detection, a type of focus detection technique) or a PP technique (Push-Pull detection, a type of tracking detection technique) or the like, which are employed in the field of optical disk techniques such as DVDs and CDs.

The first and second embodiments above illustrate examples where rays emitted from a light source are split into two bundles of rays at a plane containing the optical axis, such that the bundles of rays traveling through the respective spaces are converged at two different positions and form an interference pattern. However, the rays may be split into any plural number of bundles. In the case where the rays are split into two or more bundles, rays whose converged positions are at diagonal positions with respect to the optical axis interfere with each other to form an interference pattern, thus enabling a high-density recording and reproduction with an improved resolution.

The present invention is suitably employed for an information processing device which performs a very-high-density recording and reproduction on an information recording medium. In particular, the present invention is suitably employed for any rewritable information recording medium to replace a large-capacity hard disk, and an information processing device for use therewith.

This application is based on Japanese Patent Applications No. 2004-112985 filed Apr. 7, 2004 and No. 2005-107548 filed Apr. 4, 2005, the entire contents of which are hereby incorporated by reference.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An information processing device comprising:
a radiation light source; and
a converging section for converging rays emitted from the light source along an optical axis toward an information recording medium having a photosensitive layer, wherein the converging section splits the rays along the optical axis into first and second rays respectively traveling through first and second spaces as defined by opposite sides of a plane including the optical axis, and converges the first and second rays onto first and second points in the information recording medium, respectively, the photosensitive layer being interposed between the first and second points,
wherein, between the first and second points, the first and second rays interfere with each other to form interference fringes, the interference fringes representing information to be recorded in the photosensitive layer of the information recording medium.

2. The information processing device according to claim 1, wherein the first point is closer to the converging section than is the second point, and the first and second rays overlap with each other in a region which is present between the first and second points and is rotation-asymmetric with respect to the optical axis, thus forming the interference fringes.

3. The information processing device according to claim 2, further comprising a spatial modulator for transmitting or reflecting the first and second rays to cause a change in a portion of the rays entering a region of the spatial modulator during information recording, the change comprising at least one of: a
change in light amount; a change in phase; and a change in polarization state.

4. The information processing device according to claim 3, wherein,
the information recording further include a transparent layer, a transparent substrate and a reflective layer, the transparent substrate and the reflective layer sandwiching the photosensitive layer and the transparent layer and being provided on the photosensitive layer side and the transparent layer side, respectively; and
the first point is located within the transparent substrate, and the second point is located on a reflection surface of the reflective layer.

5. The information processing device according to claim 4, further comprising:
a first light splitting section located between the radiation light source and the converging section, the first light splitting section diffracting light in a predetermined polarization state;
a wavelength plate located between the first light splitting section and the information recording medium; and
a first photodetector,
wherein,
a guiding bump or dent structure is provided on the reflection surface of the reflective layer, and
reflected light obtained from the second ray being reflected from the reflection surface of the reflective layer travels through the first space and is split and deflected by the first light splitting section so as to enter the first photodetector, and based on a signal obtained by the first photodetector detecting the reflected light, the rays emitted from the light source are controlled so as to follow along the guiding bump or dent structure of the information recording medium while maintaining a predetermined convergence state.

6. The information processing device according to claim 5, wherein the information recording medium has a disk shape having a center axis, and the guiding bump or dent structure is formed as a spiral or concentric circles around the center axis.

7. The information processing device according to claim 4, further comprising a second light splitting section and a second photodetector,
wherein, during information reproduction,
the information recording medium is positioned so that the first rays are converged at the second point in the information recording medium;
reflected light obtained by the first rays being reflected from the reflective layer of the information recording medium produces diffracted light by being led through the region of the photosensitive layer in which the interference fringes are formed; and
the second light splitting section splits the first rays so as to deflect the diffracted light toward the second photodetector.

8. The information processing device according to claim 7, wherein during information reproduction, the spatial modulator blocks the second rays from arriving at the converging section.

9. The information processing device according to claim 7, wherein the diffracted light virtually originates from the first point as an imaginary emission point, and travels through the first space.

10. The information processing device according to claim 7, wherein a portion of the reflected light obtained by the first rays being reflected from the reflective layer of the information recording medium travels through the second space, and is split and deflected by the first light splitting section so as to enter the first photodetector, and based on a signal obtained by the first photodetector detecting the reflected light, the first rays emitted from the light source are controlled so as to follow along the guiding bump or dent structure of the information recording medium while maintaining a predetermined convergence state.

11. The information processing device according to claim 6, wherein the plane dividing the first space from the second space extends perpendicularly to a direction in which the guiding bump or dent structure extends.

12. The information processing device according to claim 7, wherein the information recording medium includes a plurality of pits or embossed portions, the plurality of pits or embossed portions being arrayed in a direction perpendicular to the plane dividing the first space from the second space.

13. The information processing device according to claim 7, further comprising a polygon mirror disposed on an optical path between the second light splitting section and the second photodetector, the polygon mirror having n mirror side faces (where n is an integer equal to or greater than 3) and rotating around a rotation axis, wherein the diffracted light deflected by the second light splitting section is reflected from one of the mirror side faces of the polygon mirror so as to travel toward the second photodetector, and with rotation of the polygon mirror, a brightness and darkness distribution within the deflected diffracted light sweeps over the second photodetector, whereby the brightness and darkness distribution is read by the second photodetector.

14. The information processing device according to claim 13, wherein a normal of each of the n mirror side faces of the polygon mirror constitutes a different angle with respect to the rotation axis.

15. The information processing device according to claim 1, wherein the converging section includes an objective lens and a parallel plate having opposing first and second principal faces, and a diffraction grating for changing a convergence state of light led through the parallel plate is provided in a region of the first principal face or the second principal face of the parallel plate located in the first space or the second space.

16. The information processing device according to claim 1, wherein,
the converging section includes an objective lens and a parallel plate having opposing first and second principal faces; and
a first diffraction grating for changing a convergence state of light led through the parallel plate is provided in a region of the first principal face or the second principal face of the parallel plate located in the first space, and a second diffraction grating for changing a convergence state of light led through the parallel plate is provided in a region of the first principal face or the second principal face of the parallel plate located in the second space, the first diffraction grating and the second diffraction grating providing different light diffraction angles.

17. The information processing device according to claim 1, wherein the converging section includes an objective lens having regions respectively located in the first space and the second space, the regions having different curvatures from each other.

18. An information processing device comprising:
a radiation light source; and
a converging section for splitting rays emitted from the light source along an optical axis into two bundles of rays respectively traveling through two spaces as defined by opposite sides of a plane including the optical axis, and converging one of the two bundles of rays onto a predetermined converging point,
wherein the one of the two bundles of rays is radiated in such a manner that the predetermined converging point is positioned on a reflective layer of an information recording medium carrying information recorded in the form of a three-dimensional interference pattern, and reflected light obtained by the one of the two bundles of rays being reflected from a reflection surface of the reflective layer is led through the three-dimensional interference pattern to produce diffracted light to be detected.

19. An information recording medium comprising: a transparent layer; a photosensitive layer; a transparent substrate; and a reflective layer, the photosensitive layer and the transparent layer being interposed between the transparent substrate and the reflective layer, and the transparent substrate and the reflective layer being respectively provided on the photosensitive layer side and the transparent layer side,
wherein, by means of the information processing device according to claim 1, information has been recorded in the form of interference fringes in the photosensitive layer.

20. An information recording medium comprising: a transparent layer; a photosensitive layer; a transparent substrate; and a reflective layer, the photosensitive layer and the transparent layer being interposed between the transparent substrate and the reflective layer, and the transparent substrate and the reflective layer being respectively provided on the photosensitive layer side and the transparent layer side,
wherein, through interference between first convergent light converged at a point in the transparent substrate and second convergent light converged at a point on a face of the reflective layer facing the transparent layer, both points being on a line perpendicular to the reflective layer, a three-dimensional interference pattern of interference fringes has been formed in the photosensitive layer, the three-dimensional interference pattern occupying a region which is rotation-asymmetric with respect to the line,
wherein, by modulating the first convergent light or the second convergent light with information to be recorded, the information has been contained in the three-dimensional interference pattern.

21. The information recording medium according to claim 20, wherein the first convergent light and the second convergent light respectively propagate through two regions as divided by a plane containing the line perpendicular to the reflective layer.

22. The information recording medium according to claim 21, wherein the information recording medium has a disk shape having a center axis, a plurality of said three-dimensional interference patterns being arranged on the disk, and the information recording medium includes a guiding bump or dent structure which is formed as a spiral or concentric circles around the center axis.

23. The information recording medium according to claim 22, wherein the plane containing the line perpendicular to the reflective layer extends perpendicularly to a direction in which the guiding bump or dent structure extends.

24. The information recording medium according to claim 21, wherein the information recording medium has a disk shape having a center axis and including a plurality of pits or embossed portions, the plurality of pits or embossed portions being arrayed in a direction perpendicular to the line perpendicular to the reflective layer.

* * * * *